(12) United States Patent
Greene

(10) Patent No.: US 11,615,151 B2
(45) Date of Patent: *Mar. 28, 2023

(54) QUERY LANGUAGE FOR SELECTING OBJECT GRAPHS FROM APPLICATION METADATA

(71) Applicant: Oracle International Corporation, Redwood Shores, CA (US)

(72) Inventor: Simeon Greene, Wellesley, MA (US)

(73) Assignee: Oracle International Corporation, Redwood Shores, CA (US)

( * ) Notice: Subject to any disclaimer, the term of this patent is extended or adjusted under 35 U.S.C. 154(b) by 238 days.

This patent is subject to a terminal disclaimer.

(21) Appl. No.: 17/079,339

(22) Filed: Oct. 23, 2020

(65) Prior Publication Data

US 2021/0056138 A1 Feb. 25, 2021

Related U.S. Application Data

(63) Continuation of application No. 15/940,769, filed on Mar. 29, 2018, now Pat. No. 10,831,831.

(51) Int. Cl.
*G06F 16/907* (2019.01)
*G06F 16/9038* (2019.01)
(Continued)

(52) U.S. Cl.
CPC ........ *G06F 16/907* (2019.01); *G06F 16/9024* (2019.01); *G06F 16/9038* (2019.01); *G06F 16/955* (2019.01)

(58) Field of Classification Search
CPC .. G06F 16/9038; G06F 16/907; G06F 16/955; G06F 16/9024; G06F 16/14; G06F 16/4387

(Continued)

(56) References Cited

U.S. PATENT DOCUMENTS 8,965,909 B2 2/2015 Herron
9,009,154 B2 4/2015 Rinckes et al.
(Continued)

OTHER PUBLICATIONS

U.S. Appl. No. 15/940,769, Non-Final Office Action dated Apr. 21, 2020, 59 pages.

(Continued)

*Primary Examiner* — Shahid A Alam
(74) *Attorney, Agent, or Firm* — Kilpatrick Townsend & Stockton LLP

(57) ABSTRACT

Methods and systems for querying application metadata objects are provided. The method may comprise receiving a query identifying an application; executing the query against a metadata model for the application to obtain a result, the result identifying a first metadata object satisfying the query, wherein the metadata model identifies a plurality of metadata objects and hierarchical relationships between the plurality of metadata objects, and wherein the metadata model comprises information about structure and semantics of data used by the application; determining, from the plurality of metadata objects, a second metadata object referenced by the first metadata object; determining, from the plurality of metadata objects, a third metadata object that is a parent object of the first metadata object; building a directed graph including the first metadata object, the second metadata object, and the third metadata object; and providing a response including the directed graph to the query.

20 Claims, 15 Drawing Sheets

(51) Int. Cl.
*G06F 16/955* (2019.01)
*G06F 16/901* (2019.01)

(58) Field of Classification Search
USPC .......................................................... 707/736
See application file for complete search history.

(56) References Cited

U.S. PATENT DOCUMENTS

| | | |
|---|---|---|
| 2002/0032696 A1 | 3/2002 | Takiguchi et al. |
| 2005/0289109 A1 | 12/2005 | Arrouye et al. |
| 2006/0041661 A1 | 2/2006 | Erikson et al. |
| 2007/0136245 A1 | 6/2007 | Hess et al. |
| 2007/0136326 A1 | 6/2007 | McClement et al. |
| 2012/0310916 A1* | 12/2012 | Abadi ............... G06F 16/24542 707/713 |
| 2017/0364698 A1* | 12/2017 | Goldfarb ............. G06F 16/9024 |
| 2019/0303509 A1 | 10/2019 | Greene |

OTHER PUBLICATIONS

U.S. Appl. No. 15/940,769, Notice of Allowance dated Aug. 6, 2020, 22 pages.

\* cited by examiner

200

```
Product:
  properties:
    product_id:
      type: string
      description: Unique identifier representing a specific product.
    description:
      type: string
      description: Description of product.
    display_name:
      type: string
      description: Display name of product.
    capacity:
      type: string
      description: Capacity of product. For example, 4 people.
    image:
      type: string
      description: Image URL representing the product.
```

FIG. 2A

QUERY LANGUAGE FOR SELECTING OBJECT GRAPHS FROM APPLICATION METADATA

CROSS-REFERENCE TO RELATED APPLICATIONS

This application is a continuation of U.S. patent application Ser. No. 15/940,769, filed Mar. 29, 2018, titled "HIERARCHICAL METADATA MODEL QUERYING SYSTEM," the entire content of which is incorporated herein by reference for all purposes.

BACKGROUND

A software application can be designed to process application data organized in a specific structure. The application data may also be organized according to specific semantics. As an example, an employee account may include a data structure that includes multiple fields, with each field for storing a specific piece of information (e.g., a "street number" field for storing a street number of an address, a "phone number" field for storing a phone number, etc.). When an account management application processes the employee account data, it may assume the data is organized based on the aforementioned structure and the semantics, and process the data accordingly. The semantics and structure of application data for different soft applications can be different.

The structure and semantics of application data can be defined in application metadata that is associated with the application data. The structure may include components of application data and the relationship (e.g., hierarchical relationships) among the components. The semantics may define a functional meaning of the application data (e.g., a field "address" is for storing a home address, a field "ID" is for storing an identifier of a user assigned by the system, etc.). This application metadata can be used for building integrations between software applications. For example, an integration application can be deployed to integrate a client application with a web service application. The integration application can extract the structures and semantics information from a metadata file storing the application metadata, and generate a set of data objects representing the structures specified in the metadata file. The integration application can also receive raw data from the client application, and package the raw data to instances of the data objects based on the semantics specified in the metadata file. The integration application can then transmit the packaged data to the web service application for processing.

Application metadata can come in a variety of formats including, for example, Web Service Definition Language (WSDL™), Swagger™, Web Application Description Language (WADL™), etc. These formats may be used to describe metadata. Parsing tools that are specific to these formats are then needed for interpreting the metadata. Further, different applications may use different metadata formats. Moreover, the structure and semantics of application data may evolve based on the updates to the underlying software application and are typically not static.

The complexities of the use of metadata and especially different formats for the metadata pose challenges to software integration. For example, in the example described above where an integration application is deployed to integrate a client application with a web service application, the integration application may be not in sync with the updates to the metadata of the web service application. Moreover, the integration application may be unable to process the metadata format being used, and thus be unable to extract the structures and semantics information from the metadata. In both cases, the integration application may generate data that cannot be processed properly by the web service application, which can lead to faulty operations.

SUMMARY

The present disclosure relates to metadata associated with applications, and more specifically to an infrastructure for building a common metadata model comprising one or more metadata objects from metadata associated with one or more applications and the metadata potentially having different formats. The infrastructure further enables the common metadata model to be queried to generate a result, where the result includes a graph representing the result of the query. Various embodiments are described herein, including methods, systems, non-transitory computer-readable storage media storing programs, code, or instructions executable by one or more processors, and the like.

The techniques disclosed herein can help overcome the challenges to software integration caused by the proliferation of disparate application metadata formats, and the evolving application metadata and its format. More particularly, according to certain embodiment a querying system is provided that can select and filter application metadata from a plurality of sources and formats, and provide the result as a graph. The querying system can receive a query from a human developer, or from an integration application, for one or more metadata objects of the application metadata. The query may specify one or more conditions for selecting the queried metadata objects. The querying system can invoke a parser to parse the application metadata to generate metadata model that represents the structure and semantics of the application metadata. From the model, the querying system can determine a first set of metadata objects referenced by the queried data objects, and a second set of metadata objects that are the parent objects of the queried metadata objects. The querying system can generate a directed graph representing the hierarchical relationships among the queried metadata objects, as well as the first and second set of metadata objects. The querying system can also represent the directed graph of the metadata objects in a set of computer codes that can be compiled and built as part of the integration application.

The querying system provides a method to discover and select objects within an application's metadata, and the method is consistent regardless of the underlying metadata formats. In addition, the directed graph provided by the querying system includes not just the queried metadata objects but also metadata objects that are hierarchically related to queried metadata objects. Therefore, any updates to the structure and/or semantics of the metadata that affects the queried metadata object can be reflected in the directed graph, and can be detected as a result. All of these enable software integration to be performed in more efficient and robust manners.

In one example, one method is provided. The method comprises: receiving, by a computer system, a query identifying an application; executing, by the computer system, the query against a metadata model for the application to obtain a result, the result identifying a first metadata object satisfying the query, wherein the metadata model identifies a plurality of metadata objects and hierarchical relationships between the plurality of metadata objects, and wherein the metadata model comprises information about structure and semantics of data used by the application; determining, by the computer system from the plurality of metadata objects, a second metadata object referenced by the first metadata object; determining, by the computer system from the plurality of metadata objects, a third metadata object that is a parent object of the first metadata object; building, by the computer system, a directed graph including the first metadata object, the second metadata object, and the third metadata object; and providing, by the computer system, a response to the query, wherein the response includes the directed graph.

In some aspects, the method further comprises: extracting, by the computer system, an identifier associated the application; receiving, by the computer system, location information identifying a location where metadata associated with the application is stored; obtaining the metadata associated with the application from the location information; and generating the metadata model for the application based upon the metadata associated with the application.

In some aspects, the method further comprises: obtaining metadata associated with the application; determining a format of the metadata; determining, from a plurality of parsers, a parser based on the format of the metadata; and executing the determined parser to generate the metadata model for the application based upon the metadata associated with the application.

In some aspects, the method further comprises: determining, from the plurality of metadata objects, a fourth metadata object referenced by the first metadata object. The directed graph may comprise a set of vertices and a set of edges, the set of vertices including vertices corresponding to the first metadata object, the second metadata object, the third metadata object, and the fourth metadata object. Each edge in the set of edges connects two vertices from the set of vertices and represents a hierarchical relationship between the metadata objects corresponding to the two vertices. The set of edges may include an edge connecting a vertex corresponding to the first metadata object with a vertex corresponding to the fourth metadata object.

In some aspects, the metadata model may comprise a plurality of nodes and information indicative of hierarchical relationships between the plurality of nodes, the plurality of nodes corresponding to the plurality of metadata objects. The method may further comprise:
determining, from the metadata model, a first node from the plurality of nodes, the first node representing the first metadata object; determining, from the metadata model and the hierarchical relationships, a leaf node that is a descendent node of the first node; determining a fourth metadata object represented by the leaf node; and building the directed graph to include the fourth metadata object.

In some aspects, the metadata model may comprise a plurality of nodes and information indicative of hierarchical relationships between the plurality of nodes, the plurality of nodes corresponding to the plurality of metadata objects and including a root node and a plurality of descendent nodes of the root node. Determining the second metadata object that is referenced by the first metadata object may comprise: determining, from the metadata model, a path between the root node of the metadata model and a first node of the plurality of descendent nodes, the first node representing the first metadata object; determining one or more intermediary nodes in the path between the root node and the first node representing the first metadata object; and determining the second metadata object based on one or more metadata objects represented by the one or more intermediary nodes.

In some aspects, the method further comprises receiving, by the computer system, connection information including at least one of: a universal resource link (URL) and credential information; establishing, by the computer system, a connection between the computer system and a remote device that stores metadata of the application; and obtaining, by the computer system, the metadata from the remote device via the connection.

In some aspects, the query may be received by the computer system from at least one of: a command line interface, or an integration software application.

In some aspects, the query may specify one or more conditions for selecting the first metadata object. The one or more conditions may include at least a part of a label associated with the first metadata object.

In some aspects, the directed graph for the first metadata object is a first directed graph. The query may specify one or more conditions for selecting the first metadata object and a fourth metadata object. The method may further comprise: building a second directed graph for the fourth metadata object; and providing the response to the query comprised including the first directed graph for the first metadata object and the second directed graph for the fourth metadata object in the response.

In some aspects, providing the response to the query comprises: converting, using a program binder, the directed graph into a set of computer instructions; and including the set of computer instructions in the response to the query.

The foregoing, together with other features and embodiments will become more apparent upon referring to the following specification, claims, and accompanying drawings.

BRIEF DESCRIPTION OF THE DRAWINGS

FIGS. 2A and 2B illustrate examples of metadata.

DETAILED DESCRIPTION

Figure 1:
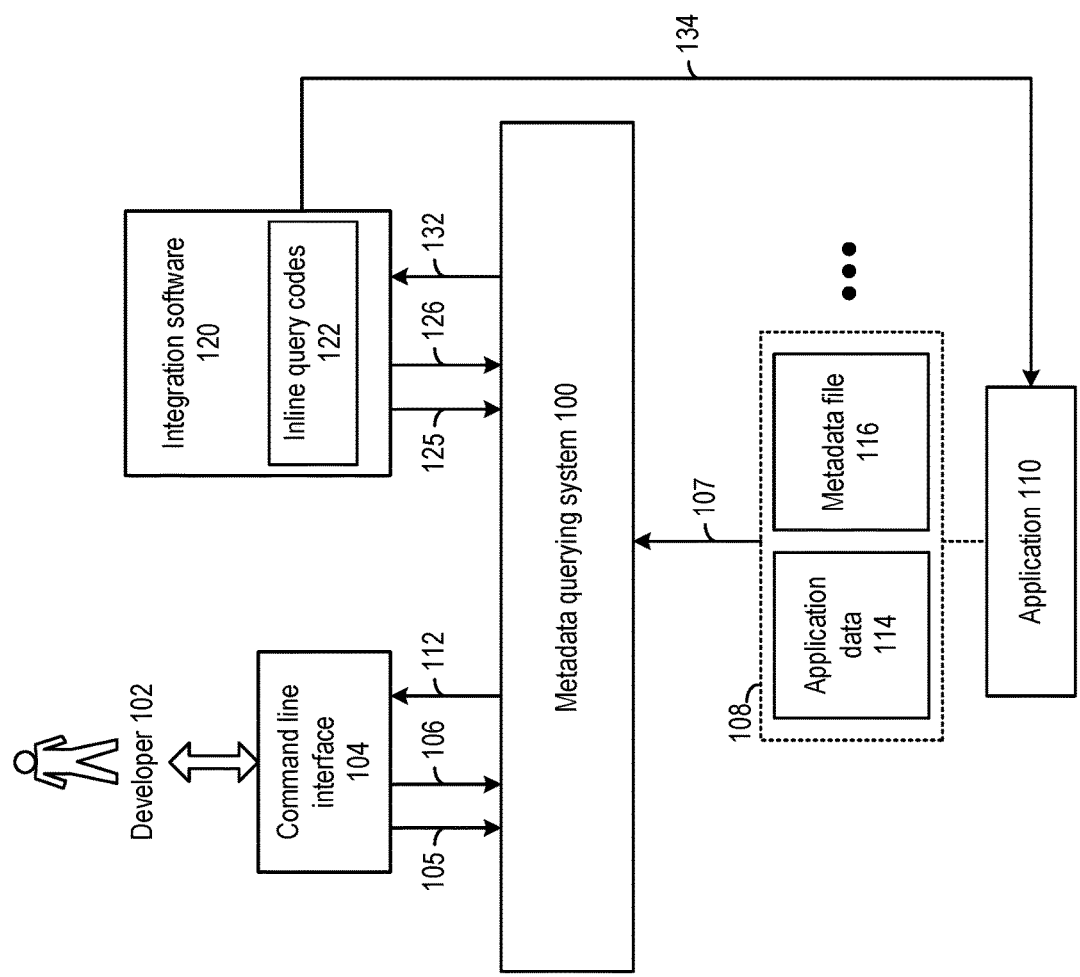
FIG. 1 is a schematic diagram of an example of a metadata querying system in accordance with the disclosed techniques.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Embodiments pertain to querying metadata objects that may be used for software integration. According to some embodiments, a querying system is provided to enable discovery of the structure and semantics of application data from application metadata of different formats.

Certain embodiments provide a querying system that can select and filter application metadata from a plurality of sources and formats, and provide the result as a graph. The querying system can receive a query from a human developer, or from an integration application, for one or more metadata objects of the application metadata. The query may specify one or more conditions for selecting the queried metadata objects. The querying system can invoke a parser to parse the application metadata to determine a model of metadata objects representing the structure and semantics of the application metadata. From the model, the querying system can determine a first set of metadata objects referenced by the queried data objects, and a second set of metadata objects that are the parent objects of the queried metadata objects. The querying system can generate a directed graph representing the hierarchical relationships among the queried metadata objects, as well as the first and second set of metadata objects. Therefore, any updates to the structure and/or semantics of the metadata that affects the queried metadata object will be reflected in the directed graph, and can be detected as a result. Moreover, the querying system operates consistently across the plurality of metadata formats. All of these enable the performance of software integration in more efficient and robust manners.

The querying system provided by the embodiments have many practical uses, one example being application integration. Application integration may refer to integrating the functionalities of a set of applications to provide certain service and/or to implement certain process. As an illustrative example, a set of business software including; supply chain management applications, enterprise resource planning applications, business intelligence applications, payroll and human resources systems, etc., can be integrated together to facilitate management of a company. The integration may include sharing of structured data (e.g., data objects, records, etc.) among the applications and enabling these applications to communicate with one another. To enable the sharing of data and the communication among the applications, integration applications can be provided as interfaces between the applications. For example, an integration application can obtain structured data of a certain structure and semantic from a first application, convert the data to a different structure and semantic for a second application, and provide the converted data to the second application. In a case where the data structure and semantic for both applications are represented in application metadata, The integration application may access the querying system to parse the application metadata for both applications and to deduce the data structure and semantic. Based on the data structure and semantic information provided by the querying system, the integration application can perform the conversion to enable seamless communication and data sharing between the first and second applications.

FIG. 1 is a schematic diagram of a metadata querying system 100, in accordance with certain embodiments. Metadata querying system 100 may be implemented using software executed by one or more processors, in hardware, or combinations thereof. For example, metadata querying system 100 can be a software system executing on one or more computer systems. Metadata querying system 100 may interface with a developer 102 via a command line interface 104. Metadata querying system 100 may receive, via the command line interface 104 and from developer 102, a query 105 as a command. Query 105 can specify one or more conditions for querying the metadata of a software application. Connection information 106 can include information used for retrieval of the metadata (e.g., the universal resource link (URL) of a source of the metadata, an identifier for application 110, connection credentials for accessing the source of the metadata, etc.). In some embodiments, at least part of connection information 106 (e.g., an application identifier) can also be included in query 105. In the example of FIG. 1, connection information 106 may include the URL of a server 108 that hosts metadata for application 110. Based on the application identifier, as well as the URL information, metadata querying system 100 can obtain metadata 107 from server 108, extract information from metadata 107 based on conditions specified in query 105, and generate a query response 112 back to command line interface 104. Command line interface 104 may receive another command from developer 102 to further process query response 112, and to output the processing result to developer 102.

Metadata 107 can describe the structure and sematic of application data 114 associated with application 110, and come in a variety of formats. FIG. 2A illustrates an example format of metadata 107. FIG. 2A illustrates metadata 107 in the Swagger™ format. Swagger™ (also known as OpenAPI™ Specification) is a specification for defining Application Programming Interfaces (API) for a Representational State Transfer (REST™) web service. In the example of FIG. 2A, metadata 107 may define the structure and semantics of application data for an inventory management application. The application data may include different categories of data. Each data category may include a structure. For example, the "product" data member may further include a set of data members (labelled "properties") including "product_id," "description," "display_name," "capacity," and "image." Each of these properties is associated with a "type" attribute and a "description" attribute. Moreover, the semantics of the application data can be defined based on the "description" attribute. For example, as shown in FIG. 2A, the "product_id" property is mapped to a unique identifier representing a specific product, whereas the "display_name" property is mapped to the display name of a product. Information of metadata 107 may be contained in a metadata file 116 hosted on server 108. The metadata file can be, for example, part of a metadata specification document, an API definition file, etc.

Figure 2B:
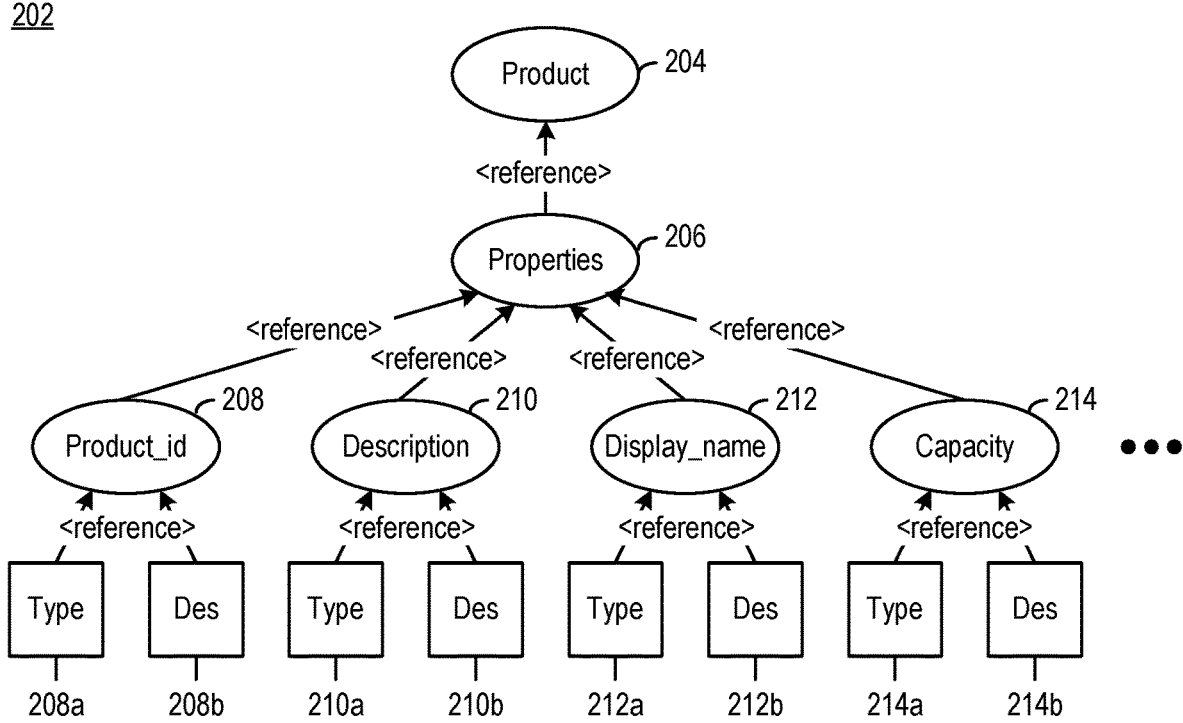

The structure of application data can also be represented in the form of a metadata model. The metadata model may describe a hierarchical structure with a number of metadata objects. Each metadata object may represent a certain data member in the metadata, whereas the hierarchical structure may represent the dependency relationships among these data members. FIG. 2B illustrates an example of a metadata model. For example, metadata model 202 of FIG. 2B illustrates an example of a model representation of the data category "product" as defined in text excerpt 200. In the example of metadata model 202, the "product" category of metadata 107 can be represented by a metadata object 204. As described above, the "product" category includes a collection of properties (e.g., including "product_id," "description," "display_name," "capacity," and "image"), each of which has a data type and a description. In metadata model 202, the relationship between the "product" and the collection of properties can be represented by a hierarchical structure comprising a "properties" metadata object 206 referenced by the "product" metadata object 204. The hierarchical structure further comprises a "product_id" metadata object 208, a "description" metadata object 210, a "display_name" metadata object 212, and a "capacity" metadata object 214. Each of metadata objects 208, 210, 212, and 214 is referenced by "properties" metadata object 206, and includes a data type attribute (one of attributes 208a, 210a, 212a, and 214a) and a description attribute (one of attributes 208b, 210b, 212b, and 214b). The reference relationships (e.g., "properties" metadata object 206 being referenced by "product" metadata object 204, "product_id" meta object 208 being referenced by "properties" metadata object 206, etc.) are represented by the direction of the arrow edges in metadata model 202.

Referring back to FIG. 1, query 105 may include one or more conditions for selecting certain metadata objects (e.g., any metadata object with the label "properties"). Metadata querying system 100 may obtain metadata file 116 hosted on server 108 (based on connection information 106), extract text data representing metadata 107 (e.g., in the Swagger format) from metadata file 116, and then invoke a parser to parse the text data. Based on the parsing result, metadata querying system 100 can determine a set of metadata objects, and a metadata model (e.g., metadata model 202) representing the hierarchical relationships among these metadata objects. Metadata querying system 100 then can apply query 105 against the metadata model to identify the metadata objects being queried. In this particular example, metadata querying system 100 may determine that the "properties" metadata object 206 satisfies the conditions included in query 105. Based on this determination, metadata querying system 100 may include the "properties" metadata object 206 in query response 112.

In addition to providing one or more metadata objects selected according to query 105, metadata querying system 100 may also provide other metadata objects that are hierarchically related to the selected metadata object in query response 112. For example, in addition to providing "properties" metadata object 206, metadata querying system 100 may also refer to metadata model 202 and determine a set of metadata objects that are referenced by "properties" metadata object 206. Referring back to FIG. 2B, metadata querying system 100 may determine that "product_id" metadata object 208, "description" metadata object 210, "display_name" metadata object 212, and "capacity" metadata object 214 is referenced by "properties" metadata object 206. Based on these determination, metadata querying system 100 may include "product_id" metadata object 208, "description" metadata object 210, "display_name" metadata object 212, and "capacity" metadata object 214 in query response 112 as well. In addition, in a case where "properties" metadata object 206 is derived from, and inherits all the attributes of, another parent metadata object (not shown in FIG. 2B), metadata querying system 100 may also include the parent metadata object in query response 112 as well. As to be discussed in more details below, metadata querying system 100 can generate a directed graph representing the hierarchical relationships among the selected metadata objects, the parent metadata objects of the selected metadata objects, and the metadata objects referenced by the selected metadata objects, and include the directed graph as part of query response 112.

By providing a set of metadata objects that are hierarchically related to the selected metadata object in response to the query, metadata querying system 100 enables efficient tracking of changes to the structure of application data. The tracking can be based on post-processing of query response 112 to detect changes in the set of metadata objects hierarchically related to the selected metadata object. For example, the metadata 107 may have been updated, and the collection of properties of the "product" data category no longer includes the "capacity" member. As a result, a query response 112 generated from the updated metadata 107 (in response to a query for the "properties" metadata objects) may include "properties" metadata object 206, "product_id" metadata object 208, "description" metadata object 210, and "display_name" object 212, etc., but not "capacity" metadata object 214. Based on a comparison between the most recent query response 112 and a prior query response 112 for the same query, the removal of the "capacity" member can be detected. Based on this detected change, developer 102 can update the integration software to exclude the "capacity" data member in the "product" data provided to application 110. This enables the integration software to provide application data conforming to the most updated structure and semantics to application 110.

In addition to interacting with developer 102 via command line interface 104, metadata querying system 100 can also interact with integration software 120. Integration software 120 may include inline query codes 122 that can also generate a query 125 and connection information 126 similar to, respectively, query 105 and connection information 106, and generate metadata objects from metadata 107 in response to the query 125. Metadata querying system 100 may generate a response 132 including the metadata objects using a binder program. The binder program can be part of an API configured to generate data in a format compatible with integration software 120. For example, if integration software 120 is written in JAVA language, the binder program can be part of a JAVA API. The binder program can convert the metadata objects (and their hierarchical relationships) into, for example, instances of JAVA objects. Based on response 132, integration software 120 can obtain the structure and semantics information of metadata 107. Integration software 120 may also generate data 134 package based on structure and semantics information, and transmit the data to application 110.

Figure 3:
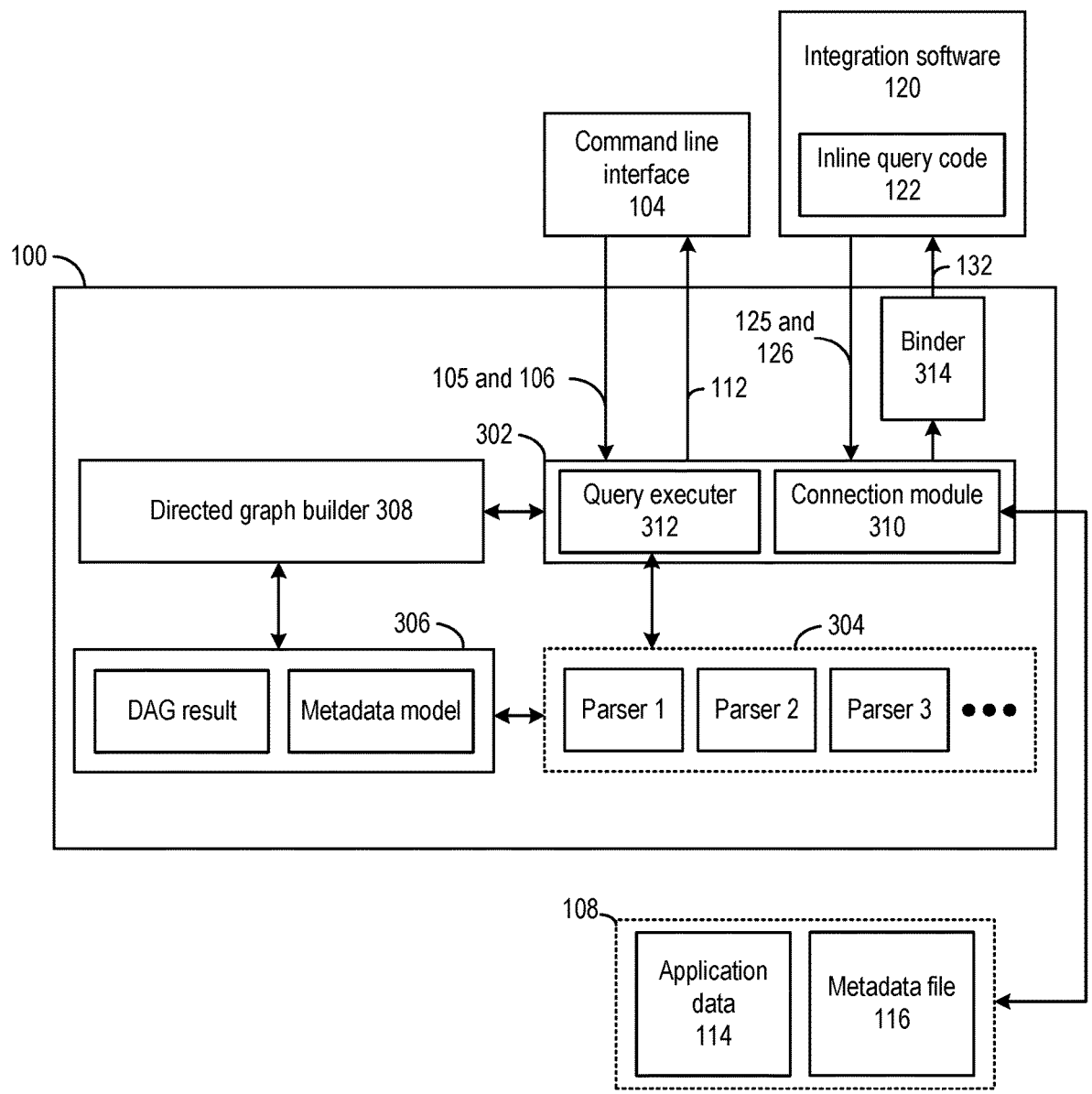
FIG. 3 illustrates an example of the components of the system of FIG. 1 in accordance with the disclosed techniques.

FIG. 3 illustrates examples of the components of metadata querying system 100, in accordance with the disclosed techniques. As shown in FIG. 3, metadata querying system 100 includes a command processor 302, a parser set 304, storage 306, a directed graph builder 308, and a binder 314. Command processor 302 further includes a connection module 310, and a query executer 312.

Command processor 302 can receive a command from command line interface 104, integration software 120, etc., and execute the command. The command can be in the form of text strings and include, for example, a query for metadata objects, connection information, etc. Command processor 302 can extract keywords from the command to determine whether the command includes a query or connection information. If the command includes connection information, command processor 302 will route the command to connection module 310 for processing. On the other hand, if the command includes a query, command processor 302 will route the command to query executer 312 for processing.

Connection module 310 can parse the text strings of the connection information, and establish a network connection (e.g., an HTTP connection) with another device (e.g., a server) to obtain the metadata for the query. As discussed above, the connection information may include, for example, the identifier of application 110, a URL, credential information, to establish the connection. In the example shown in FIGS. 1 and 3, based on the connection information, connection module 310 can establish a network connection with server 108, obtain metadata file 116, and provide the metadata file to query executer 312. In some embodiments, connection module 310 may include a socket API for establishing the network connection, as well as other software routines for transmitting, receiving, and processing HTTP packets.

Query executer 312 can execute the query against a metadata model, and provide a set of metadata objects as a query response. To begin with, query executer 312 can parse the text strings of the query, and determine a set of conditions for selecting metadata objects based on a result of the parsing. In some embodiments, the query can be part of a query language with a specific structure and semantics. As part of the parsing, query executer 312 can identify query language keywords, as well as parameters associated with the query language keywords, from the query. Based on the predefined semantics of the identified keywords, as well as their associated parameters in the query, query executer 312 can determine the set of conditions for selecting metadata objects. As an illustrative example, query executer 312 may identify a keyword "select" from the query text strings, and determine that a set of query text strings following the keyword "select" includes the labels of metadata objects selected as the subjects of the query. Query executer 312 may also identify a keyword "where" from the query text strings, and determine that a set of query text strings following the keyword "where" defines additional criteria for filtering the list of metadata objects obtained based on the parameters associated with the keyword "select."

Before the execution of the query, query executer 312 can also obtain the metadata model for executing the query, based on the metadata file (e.g., metadata file 116) received from connection module 310. In one example, to obtain the metadata model, query executer 312 can select a parser, from parser set 304, to parse metadata file 116. The selection can be based on the format of metadata file 116. As discussed above, metadata file can come in a variety of formats including, for example, Web Service Definition Language (WSDL), Swagger, Web Application Description Language (WADL), etc. Each format may require a specific parsing tool. For example, WSDL and WADL formats may require an Extensible Markup Language (XML) parser, whereas Swagger format may require a JavaScript Object Notation (JSON) parser. Query executer 312 may determine the metadata format (e.g., based on a tag in the file, the file extension, etc.), and select a compatible parser from parser set 304 to process the metadata file. The parser can identify a set of keywords and symbols from the metadata file based on a set of predetermined semantics and structures associated with the metadata format. Based on these keywords and symbols, the parser can also extract the data elements, and determine the structures and dependency relationships among these data elements. Based on this information, metadata querying system 100 can construct a metadata model comprising a set of metadata objects, as explained with reference to FIG. 2A and FIG. 2B. The metadata model can then be stored in storage 306.

In addition to parsing a metadata file, query executer 312 can obtain the metadata model in other ways. For example, query executer 312 can obtain application data 114 from storage, and perform introspection. For example, application data 114 may include instances of data structured based on metadata 107. By introspecting the structure of the data, query executer 312 may deduce the structure and semantics of metadata 107.

After the construction of the metadata model completes, query executer 312 can execute the query on the metadata model. Query executer 312 may select one or more metadata objects from the metadata model based on the selection/filtering criteria determined from the query. In addition, query executer 312 may identify a set of metadata objects that are hierarchically related to the selected metadata objects. For example, as explained above with reference to FIG. 2A and FIG. 2B, query executer 312 may identify a set of metadata objects that are referenced by selected metadata objects, as well as the parent objects of the selected metadata objects, and include those metadata objects in the query response.

In addition, query executer 312 can also operate with directed graph builder 308 to construct a directed graph for each of the selected metadata objects. The directed graph may include a set of vertices connected by the edges, with each of the edges being associated with a direction. The set of vertices may represent one of the selected metadata objects, as well as a set of metadata objects that are hierarchically related to that selected metadata object. The direction of the edges may represent a hierarchical relationship. Such a hierarchical relationship may include, for example, a first metadata object (represented by a first vertex in a directed graph) being referenced by a second metadata object (represented by a second vertex in the directed graph), or that the second metadata object is a parent object of the first metadata object. In both cases, the first vertex can be connected with the second vertex by an edge that points towards the second vertex. Directed graph builder 308 may construct a directed graph accordingly to reflect the hierarchical relationships among the metadata objects as they appear in the metadata model. The directed graph can be stored in storage 306 as well.

Figure 4A:
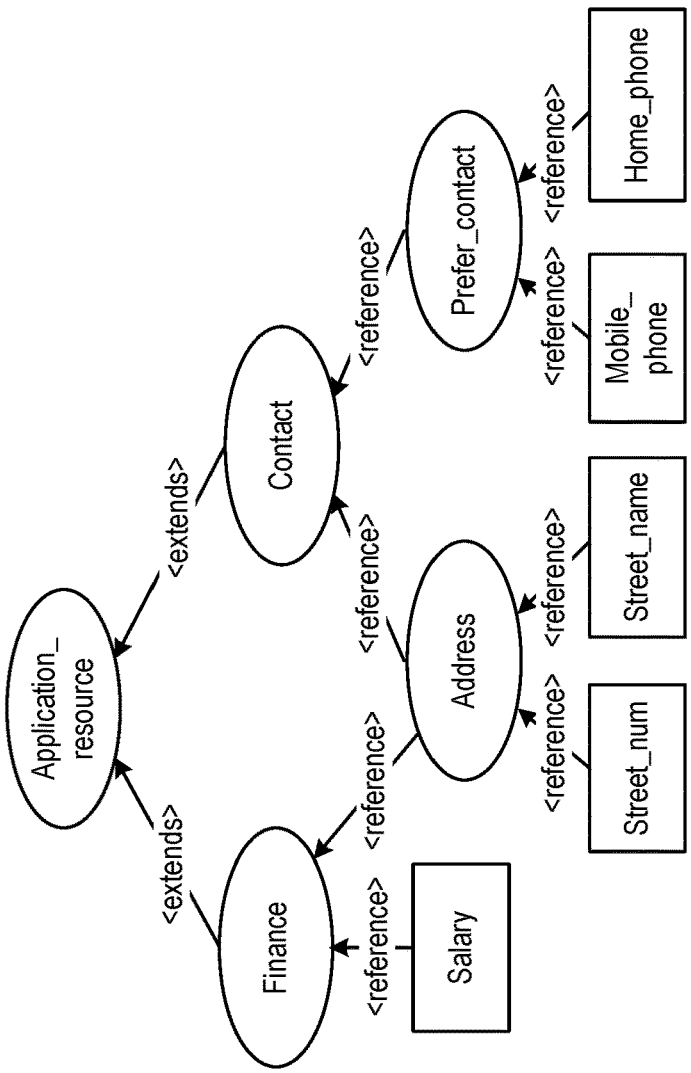
FIGS. 4A-4D illustrate examples of operations involved in constructing a directed graph from a metadata query in accordance with the disclosed techniques.

FIGS. 4A-4D illustrate examples of operations involved in constructing a directed graph from a metadata query. FIG. 4A shows a text excerpt 400 of metadata 402. Metadata 402 can define the structure of application data for an account management system. Metadata 402 may include, for example, an "application_resource" metadata object, a "contact" metadata object, an "address" metadata object, a "prefer_contact" object, and a "finance" object. The "application_resource" metadata object is a parent object of the "contact" metadata object and of the "finance object" (based on the "extends" keyword). Both the "contact" and "finance" metadata objects extend from the "application_resource" metadata object, and inherit the "address" metadata object from the "application_resource" metadata object. In the example of FIG. 4A, the "contact" metadata object references a set of object attributes including the "address" metadata object and the "prefer_contact" object, whereas the "finance" object only references the "address" metadata object. Moreover, the "address" metadata object references a set of text attributes "street_num" and "street_name," whereas the "prefer_contact" metadata object references a set of text attributes "mobile_phone" and "home_phone."

In addition, metadata model 406 provides a graphical representation of metadata 402 as described in text excerpt 400. As shown in FIG. 4A, metadata model 406 may resemble a tree structure including a set of nodes. The root node can represent the "application_resource" object, whereas the descendant nodes represent, for example, objects that extend from the "application_resource" object (e.g., the "finance" object and the "contact" object), as well as object attributes and non-object attributes being referenced (e.g., "address" object, "street_num" attribute, etc.). The non-object attributes can be attributes associated with primitive data type such as integers and strings, as well as operations, and do not reference other attributes (object or non-object attributes).

Figure 4B:
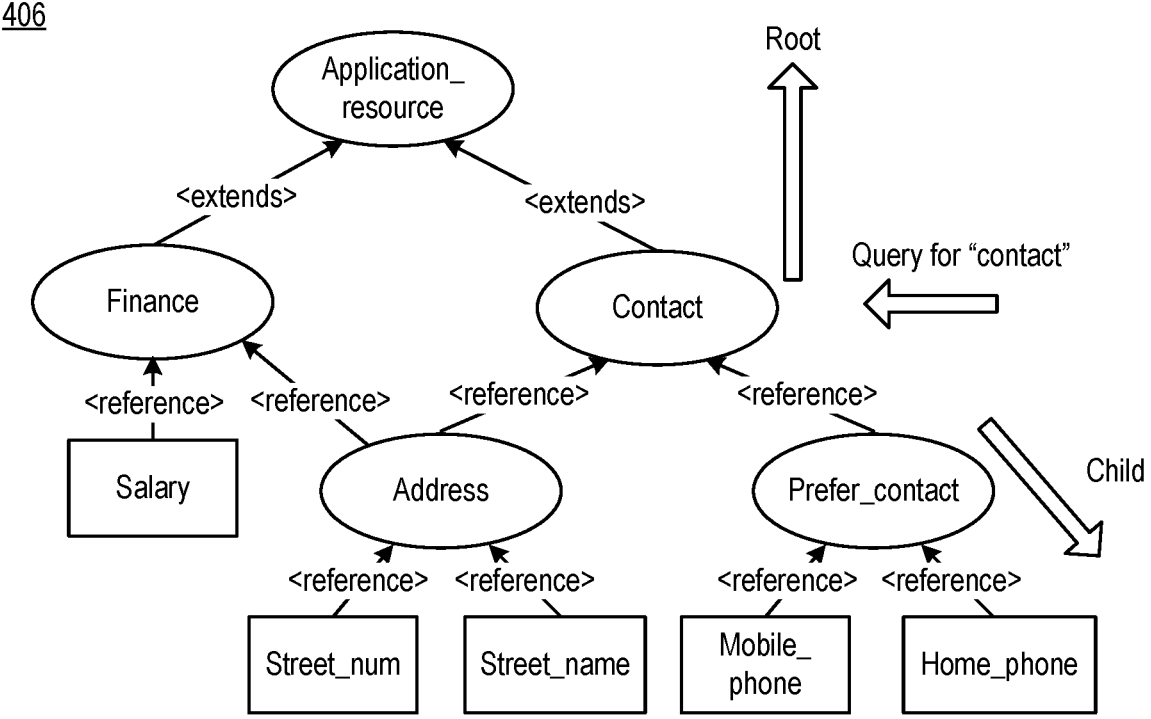
Figure 4B:
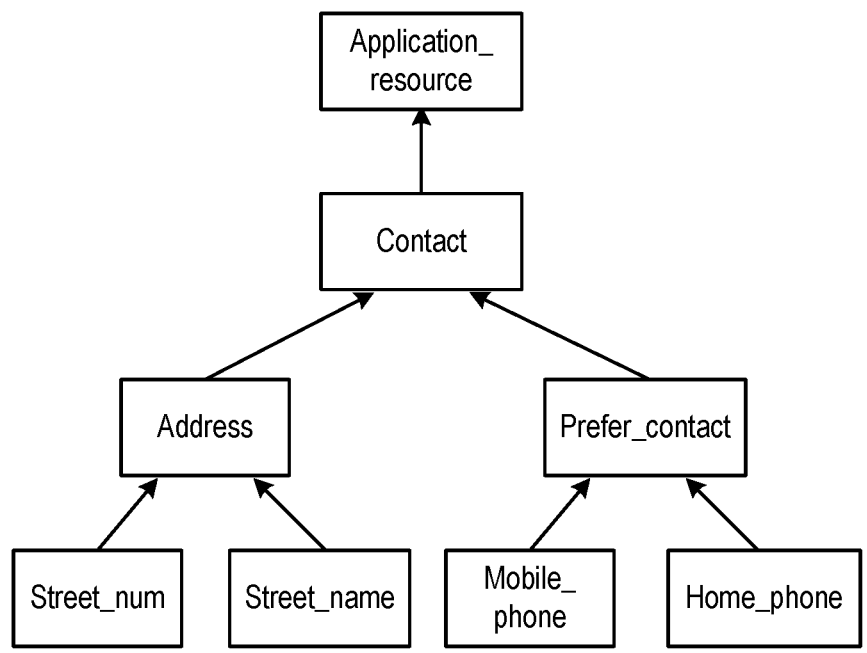

FIG. 4B shows an example of a directed graph 410 generated by directed graph builder 308 when query executer 312 executes a query on metadata model 406. In the example of FIG. 4B, the query selects the "contact" metadata object. With the "contact" metadata object as a starting point, directed graph builder 308 can traverse metadata model 406 along a path towards the root node. Directed graph builder 308 can store all of the metadata objects along the path to the root node as the parent objects of the "contact" metadata object. For example, based on the "extends" relationship between the metadata objects, directed graph builder 308 can determine that the "application_resource" metadata object is a parent object of the "contact" metadata object. Directed graph builder 308 may also determine that the "application_resource" metadata object is the root node within metadata model 406, since the "application_resource" metadata object does not extend from any other metadata objects. In this example, directed graph builder 308 may determine that the "application_resource" metadata object is the only parent object of metadata model 406.

Directed graph builder 308 can also determine the subgraphs of the metadata model rooted at the node presenting the "contact" metadata object. Directed graph builder 308 can traverse metadata model 406 towards the descendent nodes to identify a set of attributes referenced by the "contact" metadata object, and attributes referenced by each of the set of attributes, if any. Directed graph builder 308 may include a buffer to store the identified attributes as it traverses the metadata model. The traversal may proceed until a predetermined node and/or a leaf node is reached. At the end of the traversal, directed graph builder 308 can determine the subgraphs based on the identified attributes stored in the buffer.

Figure 4C:
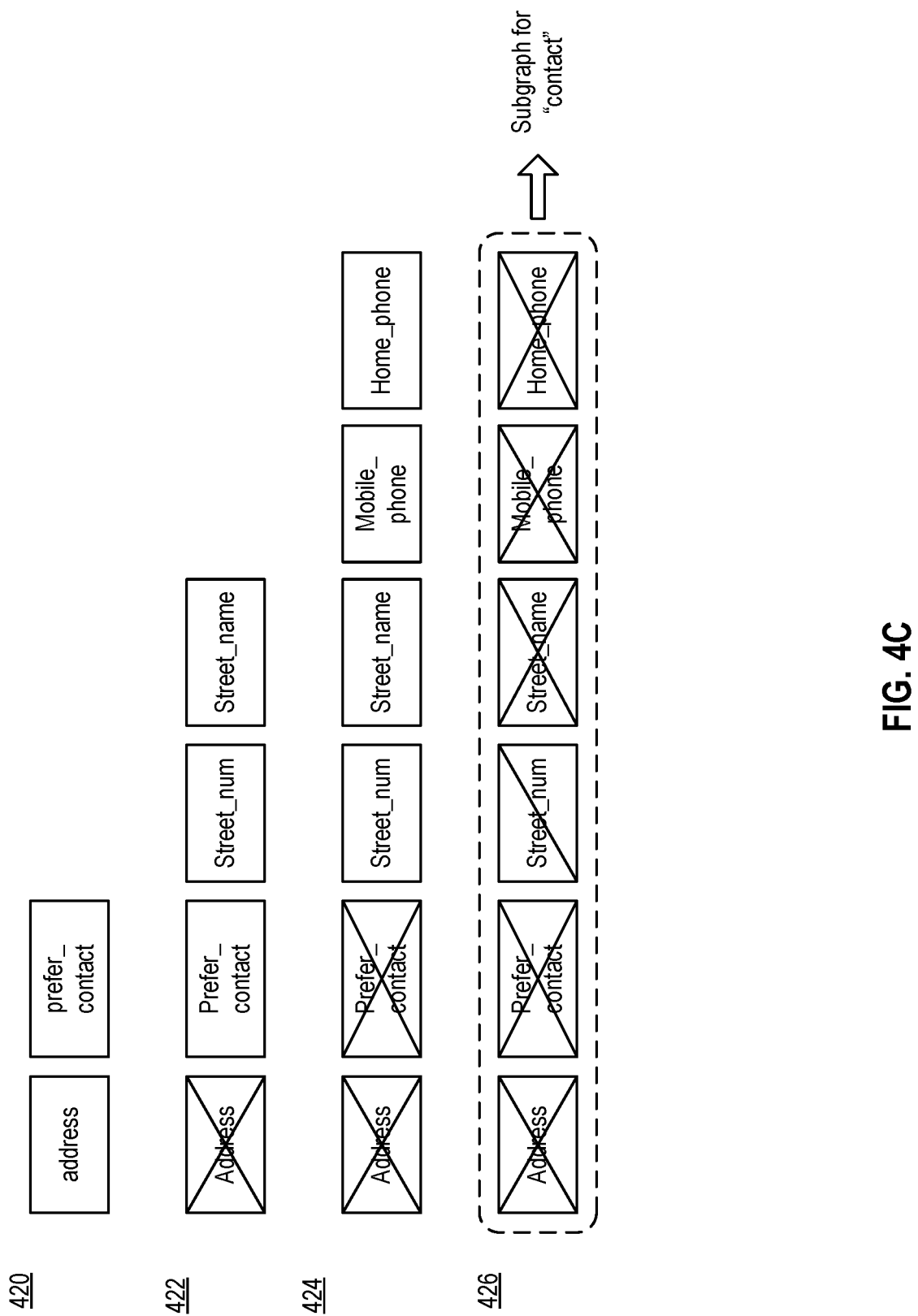

FIG. 4C illustrates an example of a sequence of changes of the attributes stored in the buffer, as directed graph builder 308 traverses metadata model 406 from a parent node (e.g., the "contact" metadata object) towards the descendant nodes of the "contact" metadata object. To begin with, directed graph builder 308 determines a set of attributes referenced by the "contact" metadata object, and identify the "address" and "prefer_contact" metadata objects. Directed graph builder 308 then stores the "address" and "prefer_contact" metadata objects in the buffer to form a list, as shown in state 420. Each member of the list can be an object attribute (e.g., "address" metadata object) or a non-object attribute (e.g., "street_num"). Directed graph builder 308 then determines a set of attributes referenced by the "address" metadata object (the non-object attributes "street_num" and "street_name"), and append them to the list. Directed graph builder 308 also marks the "address" metadata object as "processed" (represented by "X"), as shown in state 422. Directed graph builder 308 then moves to the "prefer_contact" metadata object (the next unprocessed attribute in the list), then adds the attributes referenced by the "prefer_contact" (e.g., "mobile_phone" and "home_phone") to the list of attributes, and marks the "prefer_contact" metadata object as "processed" as shown in state 424. Directed graph builder 308 then goes through the rest of the list, until all of the attributes in the list have been processed, which marks the end of the traversal. State 426 shows the list of attributes at the end of the traversal, when the entire list has been marked as "processed." The list of attributes thus generated can include all of the object attributes and non-object attributes in the subgraph of the "contact" metadata object. Directed graph builder 308 can then combine the parent nodes and the subgraph to form directed graph 410 of FIG. 4B.

Figure 4D:
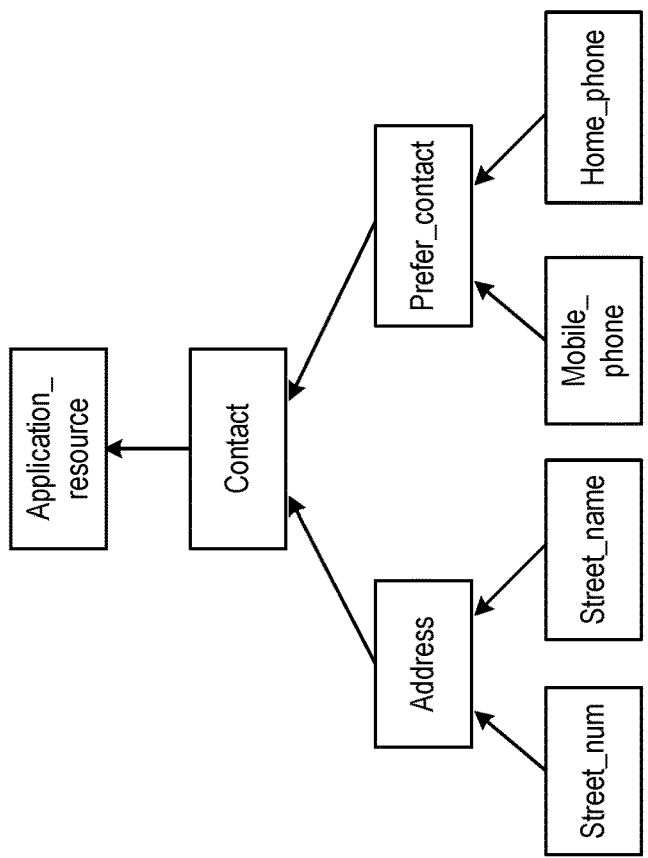

Referring back to FIG. 3, metadata querying system 100 further includes a binder program 314 to convert a directed graph into a format compatible with integration software 120. For example, if integration software 120 is written in JAVA language, binder program 314 can be part of a JAVA API to convert the nodes of the directed graph into instances of JAVA objects. Binder program 314 can also determine the hierarchical relationships (e.g., parent/child "extends" relationships) among the JAVA objects, as well as the structures of the JAVA objects (e.g., the referenced object attributes and non-object attributes), based on the edges of the directed graph. FIG. 4D illustrates an example of JAVA code 440 converted from directed graph 410 of FIG. 4B.

As shown in FIG. 4D, the metadata objects that correspond to the vertices of directed graph 410 can be represented as JAVA classes. For example, the classes "application_resource," "contact," "address," and "prefer_contact" correspond to, respectively, the metadata objects application_resource," "contact," "address," and "prefer_contact." The JAVA classes also represent the hierarchical relationships among the metadata objects and attributes shown in directed graph 410. For example, the "application_resource" metadata object is a parent object to the "contact" metadata object, and references the "address" metadata object. Moreover, the metadata object attribute "prefer_contact" is referenced by the "contact" metadata object. The corresponding classes in JAVA code 440 also manifest these hierarchical relationships. For example, the "application_resource" class instantiates an "address" class object, the "contact" class extends the "application_resource" class and instantiates a "prefer_contact" class object. The non-object attributes (e.g., street_num, street_name, mobile_phone, home_phone, etc.) are also instantiated in the classes to reflect the reference relationships in directed graph 410. JAVA code 440 can then be included in response 132 to integration software 120.

Figure 5:
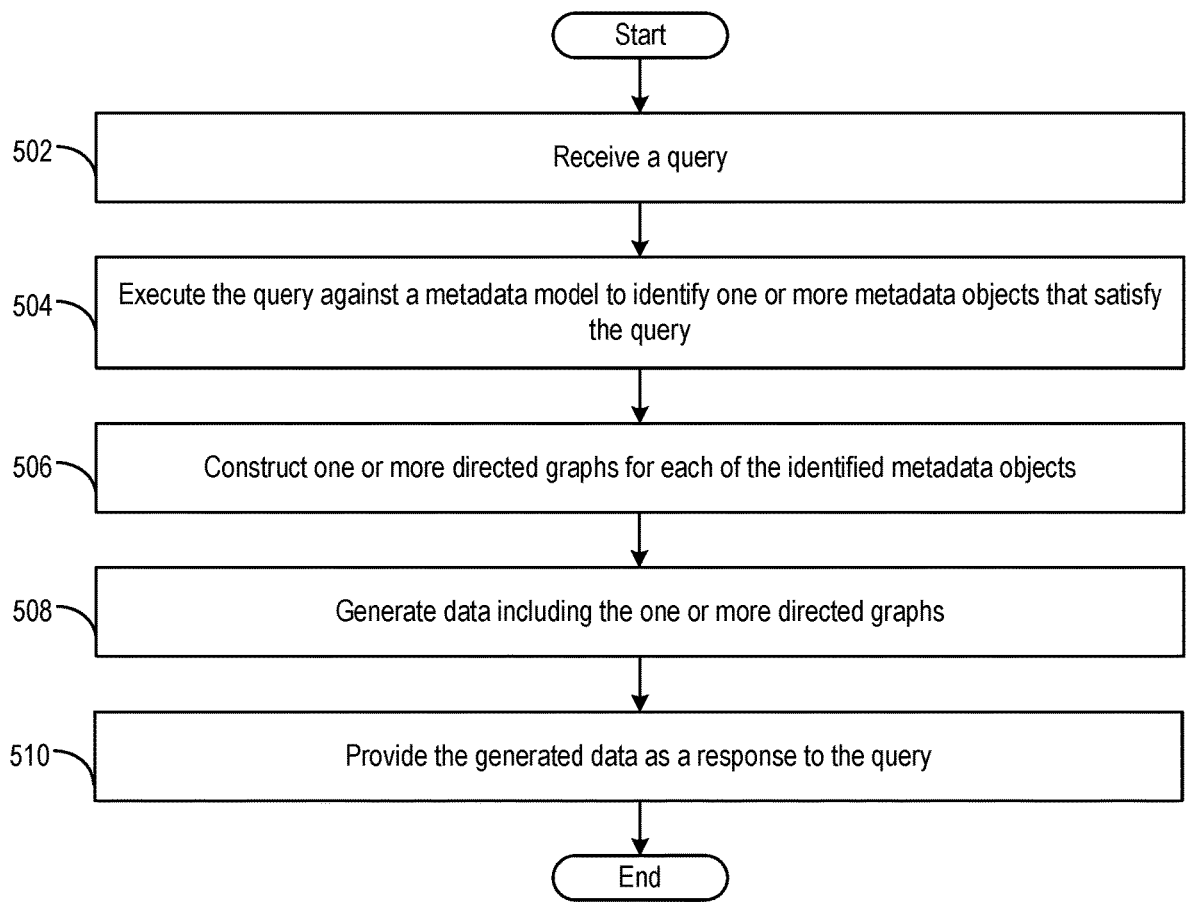
FIGS. 5-8 are flow diagrams that illustrate operations of the FIG. 1 system for processing a metadata query.

FIG. 5 is a flow diagram that illustrates operations of metadata querying system 100 for processing a metadata query in accordance with the disclosed techniques. In operation 502 of FIG. 5, metadata querying system 100 may receive a query from, for example, a command line interface, an integration software, etc. The query may specify one or more conditions for selecting one or more metadata objects. In operation 504, query executer 312 of metadata querying system 100 may execute the query against a metadata model to identify one or more metadata objects that satisfy the query. The metadata model may be obtained based on, for example, connection information. In operation 506, directed graph builder 308 of metadata querying system 100 may construct one or more directed graphs for each of the identified metadata objects. Each of the directed graphs may include a set of vertices and edges. The set of vertices may represent one of the identified metadata objects, as well as a set of metadata objects that are hierarchically related to that identified metadata object. The edges may represent the hierarchical relationships between the identified metadata object and the set of metadata objects. In operation 508, metadata querying system 100 may generate data including the constructed directed graphs. The data may be generated by binder program 314 to become compatible with a recipient application for the data (e.g., an integration software application). For example, if the integration software application is written in JAVA, the directed graph data may be converted into a set of JAVA hierarchically related objects. In operation 510, metadata querying system 100 may provide the generated data as a response to the query.

Figure 6:
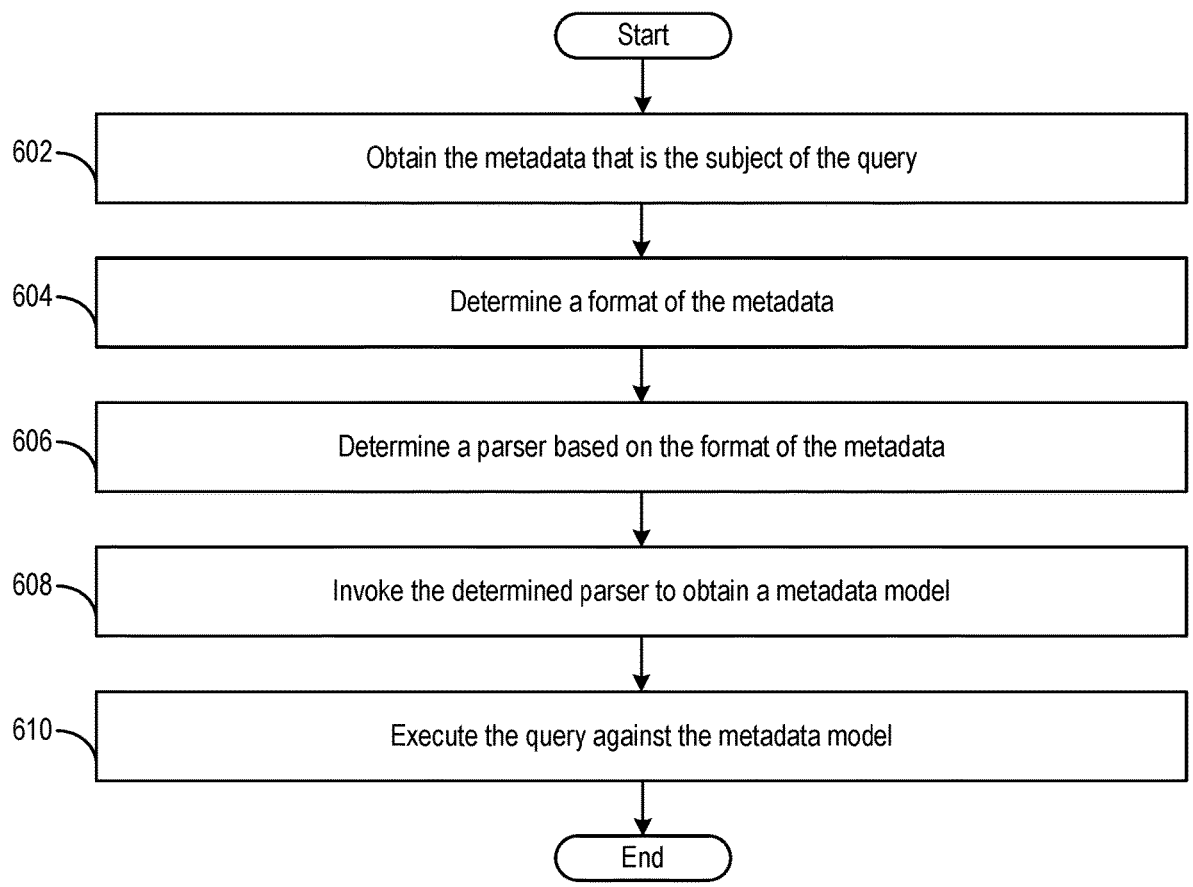

FIG. 6 is a flow diagram that illustrates a set of operations included in operation 504 (query execution) of FIG. 5 in accordance with the disclosed techniques. In operation 602 of FIG. 6, connection module 310 of metadata querying system 100 may obtain the metadata that is the subject of the query received in operation 502 of FIG. 5. Connection module 310 may determine the metadata based on, for example, an application identifier included in the query, and determine the application, as well as the associated metadata, from the identifier. Connection module 310 may also determine a location where the metadata is stored based on, for example, connection information received a command line interface, an integration software, etc. Connection module 310 can obtain the metadata based on the application identifier and the location information. In operation 604, query executer 312 may determine a format of the metadata. The determination of the format can be based on, for example, identifying a tag included in the metadata, a file extension of the metadata, etc. In operation 606, query executer 312 may determine a parser, from parser set 304, based on the format of the metadata. The determination can be based on a pre-determined association between the parsers and the metadata formats. For example, WSDL and WADL formats may require an XML parser, whereas Swagger format may require a JSON parser. In operation 608, query executer 312 may invoke the determined parser to parse the metadata obtained in operation 602, to generate a metadata model. Query executer 312 can then execute the query against the metadata model, in operation 610.

Figure 7:
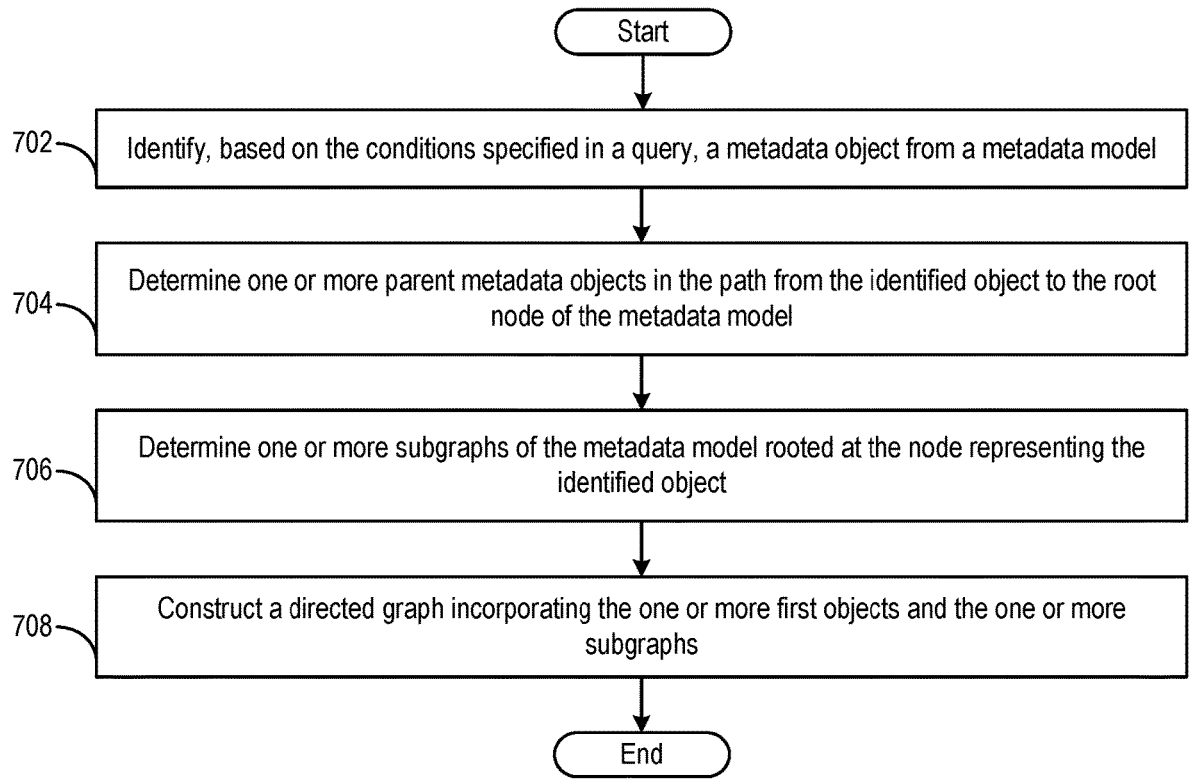

FIG. 7 is a flow diagram that illustrates a set of operations included in operation 506 (directed graph construction) of FIG. 5 in accordance with the disclosed techniques. In operation 702 of FIG. 7, query executer 312 may identify, based on the conditions specified in the query, a metadata object from the metadata model obtained in operation 608 of FIG. 6, and provide the identified metadata object to directed graph builder 308. In operation 704, directed graph builder 308 may traverse the metadata model, from the identified metadata object towards the root node direction, and determine one or more parent metadata objects in the path from the identified metadata object to the root node of the metadata model. The determination of parent metadata objects can be based on the "extends" relationship between the metadata objects. In operation 706, directed graph builder 308 may also traverse the metadata model, from the identified metadata object towards the descendant node direction. The traversal can proceed until a predetermined node is reached, and/or until a leaf node (e.g., a node that does not have any child nodes) is reached, to determine one or more subgraphs of the metadata model rooted at the node representing the identified object. The determination of the subgraph can be based on determining a set of object attributes and non-object attributes referenced by the identified object. In operation 708, directed graph builder 308 may construct a directed graph incorporating the parent metadata objects (determined in operation 704) and the subgraphs (determined in operation 706). The directed graph can then be provided as a response to the query in operation 510 of FIG. 5.

Figure 8:
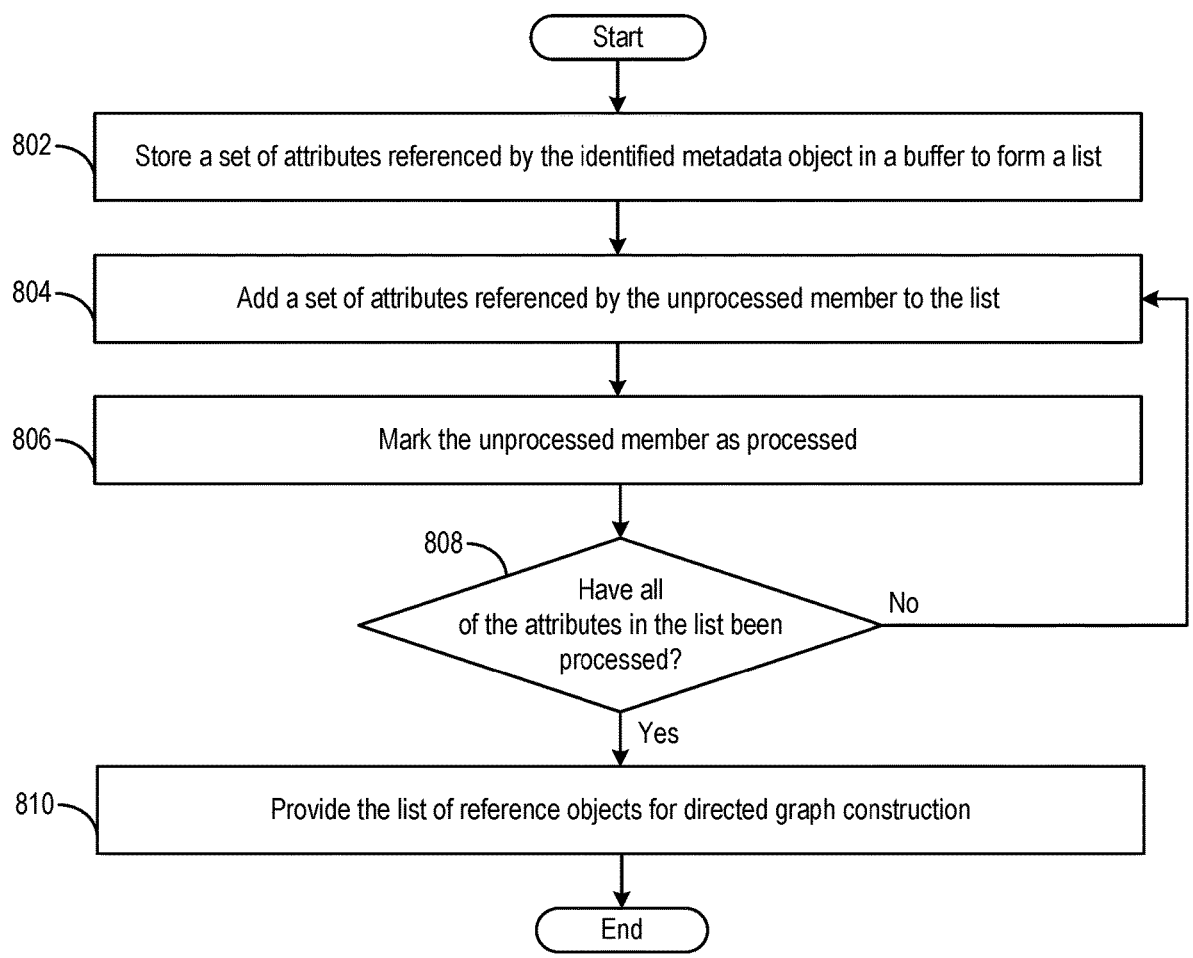

FIG. 8 is a flow diagram that illustrates a set of operations included in operation 706 (determination of subgraph) of FIG. 7 in accordance with the disclosed techniques. In operation 802 of FIG. 8, directed graph builder 308 may store a set of attributes referenced by a metadata object (identified in operation 702 of FIG. 7) in a buffer to form a list. The set of attributes referenced by the identified metadata object can be determined from the metadata model. The set of attributes can include object attributes (e.g., "address" metadata object of FIG. 4B) and non-object attributes ("street_num" of FIG. 4B). State 420 of FIG. 4C provides an example of the state of the buffer (and the list) after operation 802 completes. In operation 804, directed graph builder 308 may add a set of attributes (if any) referenced by an unprocessed attribute in the list. In operation 806, directed graph builder 308 can mark the unprocessed attribute as "processed." State 422 of FIG. 4C provides an example of the buffer and the list after operations 804 and 806 complete. In operation 808, the directed graph builder can determine whether there are other unprocessed attributes in the list. If all of the attributes in the list have been processed, directed graph builder 308 can use the list for subgraph construction in operation 810. On the other hand, if there are attributes in the list that are not processed, directed graph builder 308 can repeat operations 804 and 806, until all of the attributes in the list have been processed.

Figure 9:
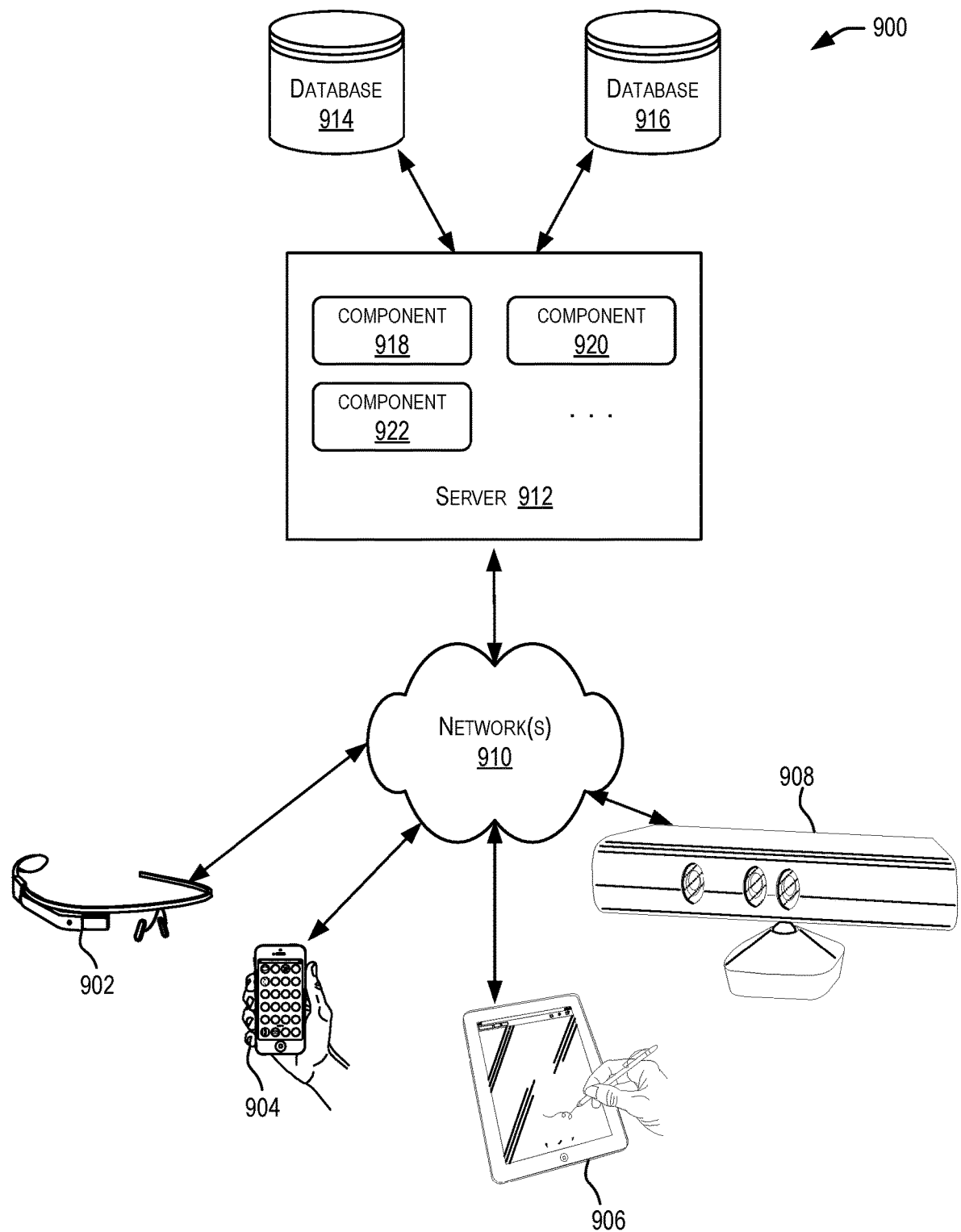
FIG. 9 depicts a simplified diagram of a distributed system for implementing one of the embodiments.

FIG. 9 depicts a simplified diagram of a distributed system 900 for implementing an embodiment of the present disclosure. In the illustrated embodiment, the distributed system 900 includes one or more client computing devices 902, 904, 906, and 908, which are configured to execute and operate a client application such as a web browser, proprietary client (e.g., Oracle Forms), or the like over one or more network(s) 910. The server 912 may be communicatively coupled with the remote client computing devices 902, 904, 906, and 908 via network 910. Client computing devices 902, 904, 906, and 908 may operate command line interface 104 and/or integration software 120 of FIG. 3.

In various embodiments, the server 912 may be adapted to run one or more services or software applications such as services and applications that provide storage management services and identity management services. In certain embodiments, the server 912 may also provide other services or software applications can include non-virtual and virtual environments. In some embodiments, these services may be offered as web-based or cloud services or under a Software as a Service (SaaS) model to the users of the client computing devices 902, 904, 906, and/or 908. Users operating the client computing devices 902, 904, 906, and/or 908 may in turn utilize one or more client applications to interact with the server 912 to utilize the services provided by these components. Server 912 may operate, for example, metadata querying system 100 of FIG. 3.

In the configuration depicted in FIG. 9, the software components 918, 920 and 922 of system 900 are shown as being implemented on the server 912. In other embodiments, one or more of the components of the system 900 and/or the services provided by these components may also be implemented by one or more of the client computing devices 902, 904, 906, and/or 908. Users operating the client computing devices may then utilize one or more client applications to use the services provided by these components. These components may be implemented in hardware, firmware, software, or combinations thereof. It should be appreciated that various different system configurations are possible, which may be different from distributed system 900. The embodiment shown in FIG. 9 is thus one example of a distributed system for implementing an embodiment system and is not intended to be limiting.

The client computing devices 902, 904, 906, and/or 908 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 910.

Although distributed system 900 in FIG. 9 is shown with four client computing devices, any number of client computing devices may be supported. Other devices, such as devices with sensors, etc., may interact with the server 912.

The network(s) 910 in the distributed system 900 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 910 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

The server 912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 912 can include one or more virtual machines running virtual operating systems, or other computing architectures involving virtualization. One or more flexible pools of logical storage devices can be virtualized to maintain virtual storage devices for the server. Virtual networks can be controlled by the server 912 using software defined networking. In various embodiments, the server 912 may be adapted to run one or more services or software applications described in the foregoing disclosure. For example, the server 912 may correspond to a server for performing processing as described above according to an embodiment of the present disclosure.

The server 912 may run an operating system including any of those discussed above, as well as any commercially available server operating system. Server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, the server 912 may include one or more applications to analyze and consolidate data feeds and/or event updates received from users of the client computing devices 902, 904, 906, and 908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 912 may also include one or more applications to display the data feeds and/or real-time events via one or more display devices of the client computing devices 902, 904, 906, and 908.

The distributed system 900 may also include one or more databases 914 and 916. These databases may provide a mechanism for storing information such as user identity information, and other information used by examples of the present disclosure. Databases 914 and 916 may reside in a variety of locations. By way of example, one or more of databases 914 and 916 may reside on a non-transitory storage medium local to (and/or resident in) the server 912. Alternatively, the databases 914 and 916 may be remote from the server 912 and in communication with the server 912 via a network-based or dedicated connection. In some examples, the databases 914 and 916 may reside in a storage-area network (SAN). Similarly, any necessary files for performing the functions attributed to the server 912 may be stored locally on the server 912 and/or remotely, as appropriate. In some examples, the databases 914 and 916 may include relational databases, such as databases provided by Oracle, that are adapted to store, update, and retrieve data in response to SQL-formatted commands.

Figure 10:
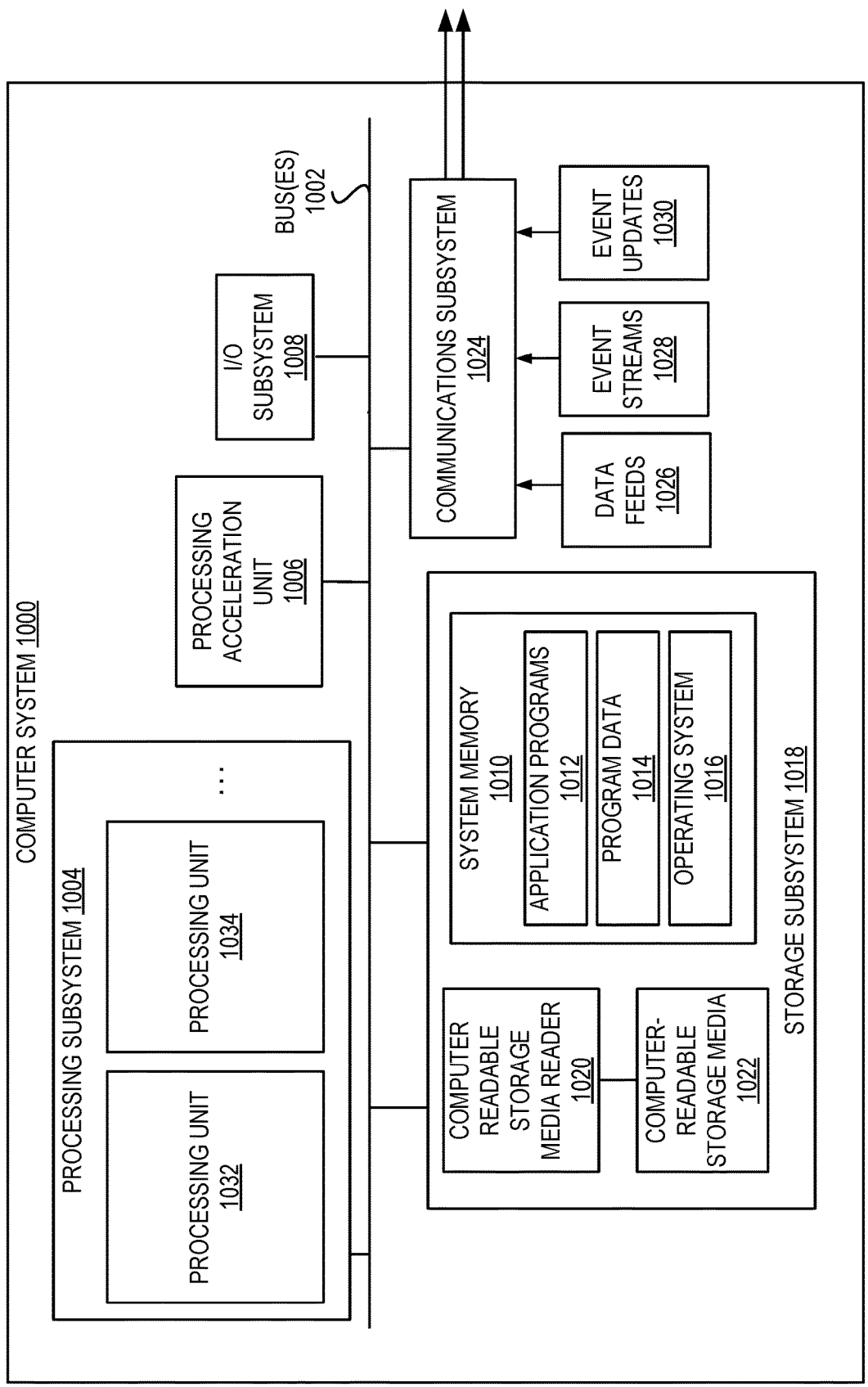
FIG. 10 illustrates an exemplary computer system, in which various embodiments may be implemented.

FIG. 10 illustrates an exemplary computer system 1000 that may be used to implement examples of the present disclosure, such as metadata querying system 100 of FIG. 1. In some examples, computer system 1000 may be used to implement any of the various servers and computer systems described above. As shown in FIG. 10, computer system 1000 includes various subsystems including a processing subsystem 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 may include tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, other examples of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA)

bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1004 controls the operation of computer system 1000 and may comprise one or more processing units 1032, 1034, etc. A processing unit may include one or more processors, including single core or multicore processors, one or more cores of processors, or combinations thereof. In some examples, processing subsystem 1004 can include one or more special purpose co-processors such as graphics processors, digital signal processors (DSPs), or the like. In some examples, some or all of the processing units of processing subsystem 1004 can be implemented using customized circuits, such as application specific integrated circuits (ASICs), or field programmable gate arrays (FPGAs).

In some examples, the processing units in processing subsystem 1004 can execute instructions stored in system memory 1010 or on computer readable storage media 1022. In various examples, the processing units can execute a variety of programs or code instructions and can maintain multiple concurrently executing programs or processes. At any given time, some or all of the program code to be executed can be resident in system memory 1010 and/or on computer-readable storage media 1022 including potentially on one or more storage devices. Through suitable programming, processing subsystem 1004 can provide various functionalities described above for dynamically modifying documents (e.g., webpages) responsive to usage patterns.

In some examples, a processing acceleration unit 1006 may be provided for performing customized processing or for off-loading some of the processing performed by processing subsystem 1004 so as to accelerate the overall processing performed by computer system 1000.

I/O subsystem 1008 may include devices and mechanisms for inputting information to computer system 1000 and/or for outputting information from or via computer system 1000. In general, use of the term "input device" is intended to include all possible types of devices and mechanisms for inputting information to computer system 1000. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1018 provides a repository or data store for storing information that is used by computer system 1000. Storage subsystem 1018 provides a tangible non-transitory computer-readable storage medium for storing the basic programming and data constructs that provide the functionality of some examples. Software (programs, code modules, instructions) that when executed by processing subsystem 1004 provide the functionality described above may be stored in storage subsystem 1018. The software may be executed by one or more processing units of processing subsystem 1004. Storage subsystem 1018 may also provide a repository for storing data according to examples of the present disclosure.

Storage subsystem 1018 may include one or more non-transitory memory devices, including volatile and non-volatile memory devices. As shown in FIG. 10, storage subsystem 1018 includes a system memory 1010 and a computer-readable storage media 1022. System memory 1010 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1000, such as during start-up, may typically be stored in the ROM. The RAM typically contains data and/or program modules that are presently being operated and executed by processing subsystem 1004. In some implementations, system memory 1010 may include multiple different types of memory, such as static random access memory (SRAM) or dynamic random access memory (DRAM).

By way of example, and not limitation, as depicted in FIG. 10, system memory 1010 may store application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1022 may store programming and data constructs that provide the functionality of some examples. Software (programs, code modules, instructions) that when executed by processing subsystem 1004, a processor can provide the functionality described above may be stored in storage subsystem 1018. By way of example, computer-readable storage media 1022 may include non-volatile memory such as a hard disk drive, a magnetic disk drive, an optical disk drive such as a CD ROM, DVD, a Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1022 may provide storage of computer-readable instructions, data structures, program modules, and other data for computer system 1000.

In some examples, storage subsystem 1018 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for storing computer-readable information.

In some examples, computer system 1000 may provide support for executing one or more virtual machines. Computer system 1000 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1000. Accordingly, multiple operating systems may potentially be run concurrently by computer system 1000. Each virtual machine generally runs independently of the other virtual machines.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to establish a communication channel to one or more client devices via the Internet for receiving and sending information from and to the client devices. For example, command line interface 104 depicted in FIG. 1 may interact with metadata querying system 100 using communication subsystem 1024.

Communication subsystem 1024 may support both wired and/or wireless communication protocols. For example, in some examples, communications subsystem 1024 may include radio frequency (RF) transceiver components for accessing wireless voice and/or data networks (e.g., using cellular telephone technology, advanced data network technology, such as 3G, 4G or EDGE (enhanced data rates for global evolution)), WiFi (IEEE 802.11 family standards, or other mobile communication technologies, or any combination thereof), global positioning system (GPS) receiver components, and/or other components. In some examples communications subsystem 1024 can provide wired network connectivity (e.g., Ethernet) in addition to or instead of a wireless interface.

Communication subsystem 1024 can receive and transmit data in various forms. For example, in some examples, communications subsystem 1024 may receive input communication in the form of structured and/or unstructured data feeds 1026, event streams 1028, event updates 1030, and the like. For example, communications subsystem 1024 may be configured to receive (or send) data feeds 1026 in real-time from users of social media networks and/or other communication services such as Twitter® feeds, Facebook® updates, web feeds such as Rich Site Summary (RSS) feeds, and/or real-time updates from one or more third party information sources.

In some examples, communications subsystem 1024 may be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1000 depicted in FIG. 10 is intended only as a specific example. Many other configurations having more or fewer components than the system depicted in FIG. 10 are possible. Based on the disclosure and teachings provided herein, a person of ordinary skill in the art will appreciate other ways and/or methods to implement the various examples.

Figure 11:
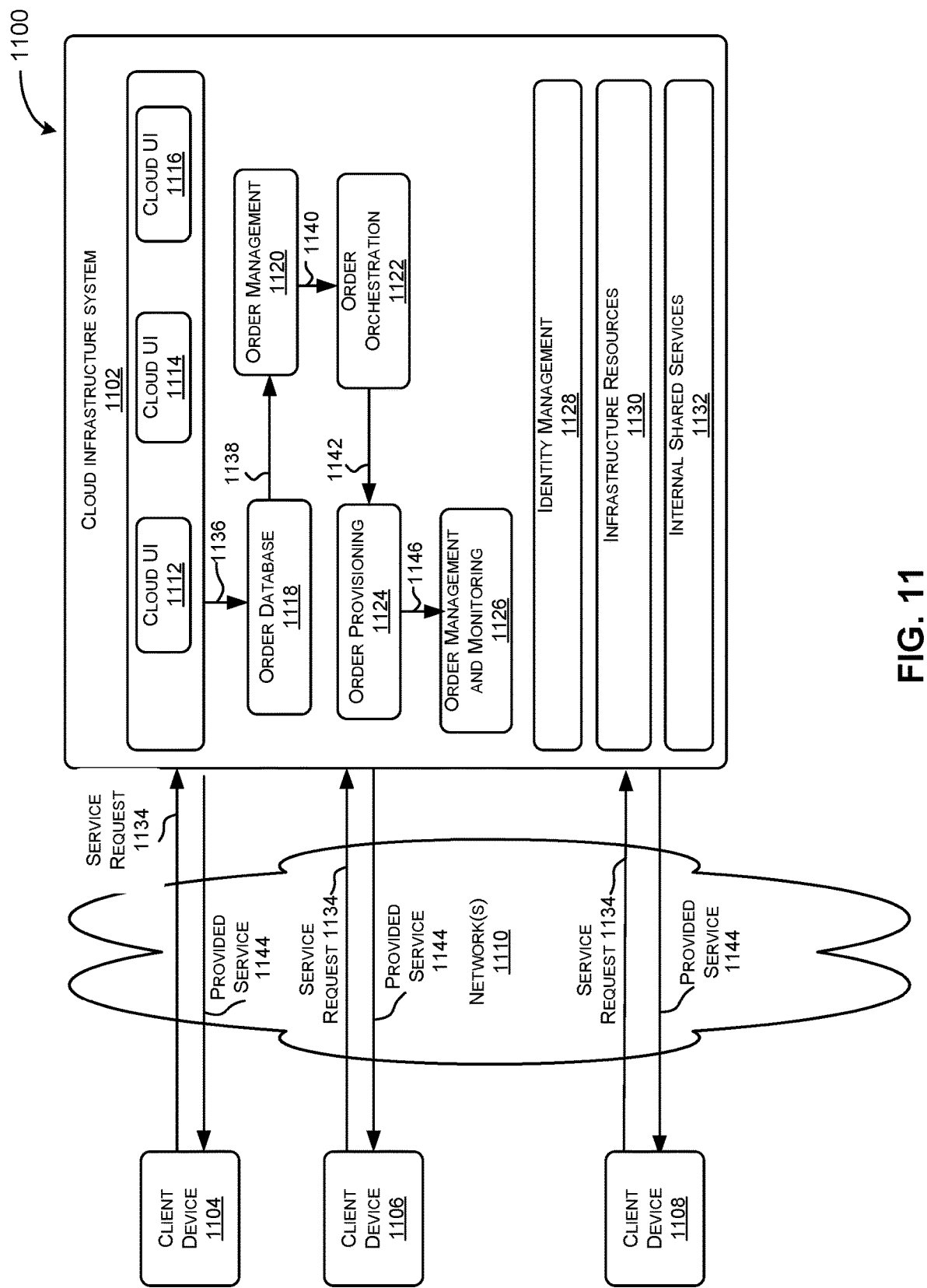
FIG. 11 illustrates a simplified block diagram of components of a system environment by which services provided by the components of an embodiment system may be offered as cloud services, in accordance with an embodiment of the present disclosure.

FIG. 11 is a simplified block diagram of one or more components of a system environment 1100 by which services provided by one or more components of an embodiment system may be offered as cloud services, in accordance with an embodiment of the present disclosure. For example, metadata querying system 100 can be provided as part of a cloud service. The query may be received from a subscriber of a service and the result returned by a cloud service. In the illustrated embodiment, system environment 1100 includes one or more client computing devices 1104, 1106, and 1108 that may be used by users to interact with a cloud infrastructure system 1102 that provides cloud services. The client computing devices may be configured to operate a client application such as a web browser, a proprietary client application (e.g., Oracle Forms), or some other application, which may be used by a user of the client computing device to interact with cloud infrastructure system 1102 to use services provided by cloud infrastructure system 1102.

It should be appreciated that cloud infrastructure system 1102 depicted in the figure may have other components than those depicted. Further, the embodiment shown in the figure is only one example of a cloud infrastructure system that may incorporate an embodiment of the invention. In some other embodiments, cloud infrastructure system 1102 may have more or fewer components than shown in the figure, may combine two or more components, or may have a different configuration or arrangement of components.

Client computing devices 1104, 1106, and 1108 may be devices similar to those described above for client computing devices 902, 904, 906, and 908, and may operate command line interface 104 and/or integration software 120 of FIG. 3.

Although exemplary system environment 1100 is shown with three client computing devices, any number of client computing devices may be supported. Other devices such as devices with sensors, etc. may interact with cloud infrastructure system 1102.

Network(s) 1110 may facilitate communications and exchange of data between clients 1104, 1106, and 1108 and cloud infrastructure system 1102. Each network may be any type of network familiar to those skilled in the art that can support data communications using any of a variety of commercially-available protocols, including those described above for network(s) 910.

Cloud infrastructure system 1102 may comprise one or more computers and/or servers that may include those described above for server 912.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1102 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1102 may be adapted to automatically provision, manage and track a customer's subscription to services offered by cloud infrastructure system 1102. Cloud infrastructure system 1102 may provide the cloud services via different deployment models. For example, services may be provided under a public cloud model in which cloud infrastructure system 1102 is owned by an organization selling cloud services (e.g., owned by Oracle) and the services are made available to the general public or different industry enterprises. As another example, services may be provided under a private cloud model in which cloud infrastructure system 1102 is operated solely for a single organization and may provide services for one or more entities within the organization. The cloud services may also be provided under a community cloud model in which cloud infrastructure system 1102 and the services provided by cloud infrastructure system 1102 are shared by several organizations in a related community. The cloud services may also be provided under a hybrid cloud model, which is a combination of two or more different models.

In some embodiments, the services provided by cloud infrastructure system 1102 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1102. Cloud infrastructure system 1102 then performs processing to provide the services in the customer's subscription order.

In some embodiments, the services provided by cloud infrastructure system 1102 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1102 may also include infrastructure resources 1130 for providing the resources used to provide various services to customers of the cloud infrastructure system. In one embodiment, infrastructure resources 1130 may include pre-integrated and optimized combinations of hardware, such as servers, storage, and networking resources to execute the services provided by the PaaS platform and the SaaS platform.

In some embodiments, resources in cloud infrastructure system 1102 may be shared by multiple users and dynamically re-allocated per demand. Additionally, resources may be allocated to users in different time zones. For example, cloud infrastructure system 1102 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1132 may be provided that are shared by different components or modules of cloud infrastructure system 1102 and by the services provided by cloud infrastructure system 1102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1102 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1102, and the like.

In one embodiment, as depicted in the figure, cloud management functionality may be provided by one or more modules, such as an order management module 1120, an order orchestration module 1122, an order provisioning module 1124, an order management and monitoring module 1126, and an identity management module 1128. These modules may include or be provided using one or more computers and/or servers, which may be general purpose computers, specialized server computers, server farms, server clusters, or any other appropriate arrangement and/or combination.

In exemplary operation 1134, a customer using a client device, such as client device 1104, 1106 or 1108, may interact with cloud infrastructure system 1102 by requesting one or more services provided by cloud infrastructure system 1102 and placing an order for a subscription for one or more services offered by cloud infrastructure system 1102. In certain embodiments, the customer may access a cloud User Interface (UI), cloud UI 1112, cloud UI 1114 and/or cloud UI 1116 and place a subscription order via these UIs. The order information received by cloud infrastructure system 1102 in response to the customer placing an order may include information identifying the customer and one or more services offered by the cloud infrastructure system 1102 that the customer intends to subscribe to.

After an order has been placed by the customer, the order information is received via the cloud UIs, 1112, 1114 and/or 1116.

At operation 1136, the order is stored in order database 1118. Order database 1118 can be one of several databases operated by cloud infrastructure system 1100 and operated in conjunction with other system elements.

At operation 1138, the order information is forwarded to an order management module 1120. In some instances, order management module 1120 may be configured to perform billing and accounting functions related to the order, such as verifying the order, and upon verification, booking the order.

At operation 1140, information regarding the order is communicated to an order orchestration module 1122. Order orchestration module 1122 may utilize the order information to orchestrate the provisioning of services and resources for the order placed by the customer. In some instances, order orchestration module 1122 may orchestrate the provisioning of resources to support the subscribed services using the services of order provisioning module 1124.

In certain embodiments, order orchestration module 1122 enables the management of business processes associated with each order and applies business logic to determine whether an order should proceed to provisioning. At operation 1142, upon receiving an order for a new subscription, order orchestration module 1122 sends a request to order provisioning module 1124 to allocate resources and configure those resources needed to fulfill the subscription order. Order provisioning module 1124 enables the allocation of resources for the services ordered by the customer. Order provisioning module 1124 provides a level of abstraction between the cloud services provided by cloud infrastructure system 1100 and the physical implementation layer that is used to provision the resources for providing the requested services. Order orchestration module 1122 may thus be isolated from implementation details, such as whether or not services and resources are actually provisioned on the fly or pre-provisioned and only allocated/assigned upon request.

At operation 1144, once the services and resources are provisioned, a notification of the provided service may be sent to customers on client devices 1104, 1106 and/or 1108 by order provisioning module 1124 of cloud infrastructure system 1102.

At operation 1146, the customer's subscription order may be managed and tracked by an order management and monitoring module 1126. In some instances, order management and monitoring module 1126 may be configured to collect usage statistics for the services in the subscription order, such as the amount of storage used, the amount of data transferred, the number of users, and the amount of system up time and system down time.

In certain embodiments, cloud infrastructure system 1100 may include an identity management module 1128. Identity management module 1128 may be configured to provide identity services, such as access management and authorization services in cloud infrastructure system 1100. In some embodiments, identity management module 1128 may control information about customers who wish to utilize the services provided by cloud infrastructure system 1102. Such information can include information that authenticates the identities of such customers and information that describes which actions those customers are authorized to perform relative to various system resources (e.g., files, directories, applications, communication ports, memory segments, etc.). Identity management module 1128 may also include the management of descriptive information about each customer and about how and by whom that descriptive information can be accessed and modified.

Although specific examples have been described, various modifications, alterations, alternative constructions, and equivalents are possible. Embodiments are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including, but not limited to, conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

Metadata Query Language Grammar, Examples and Use Cases

A. Introduction

The metadata query language is a domain specific query language for retrieving metadata object graphs from application metadata. In the following examples and use cases, the metadata query language grammar is presented in a slightly altered Extended Backus-Naur form (EBNF) format.

B. Grammar Definition

Table 1 below illustrates a mapping between tokens available in examples of the metadata query language and the operators represented by the tokens.

TABLE 1

| Tokens | Represented operators |
| --- | --- |
| OP_EQ | "=" |
| OP_GT | ">" |
| OP_LT | "<" |
| OP_GEQ | ">=" |
| OP_LEQ | "<=" |
| OP_NEQ | "!" |
| WILDCARD | "*" |
| id | "regexp:^[A-Z_a-z][A-Za-z_0-9]*$" |
| eq | "=" |
| name | "regexp:^[A-Z_a-z][A-Za-z_0-9]*$" |
| string | "regexp:('([^\\]\\.)*'\|\"([^\"\\]\\\"\\\\)*\")" |
| quoted_name | "regexp:^[\"](.\|\n)*[\"]$" |

The following are the syntaxes of other elements:

select statement::='select' object_list ['from' connection] ['where' where_clause] ['with' options] ';'
   object_list::=objects|'*'
   objects::=object {',' object}
   object::=('Object' id)
   connection::=connection_def|id
   connection_def::='{'properties'}'
   properties::=name eq string_value {'\n' properties}
   where_clause::=(predicate_function|predicate_phrase) {('and'|'or') (predicate_function|predicate_phrase)}
   predicate_function::=name'('id')'
   predicate_phrase::=predicate_of operator predicate_value
   predicate_of::=name|object_property
   object_property::=id.'['quoted_name']'{('.'id|'.'object_property)}
   operator::='='|'>'|'<'|'!='|'>='|'>='
   predicate_value::=bool_value|string_value
   bool_value::='true'|'false'|'True'|'False'|'TRUE'|'FALSE'
   options::='{'properties'}'

C. Grammar Components i. Select Statement

A statement in the query language MUST start with the literal 'select', followed by a list of objects (or wildcard for all objects), followed by an optional connection identifier.

ii. Object List

Either a list of objects or a wildcard MUST follow the keyword 'select'. Specifying a wildcard (*) means that the query will consider all objects in the underlying metadata. NOTE: this does not mean that all objects will be returned in the result graph since objects can be further filtered by the inclusion of a where clause (explained below). If only select objects are to be present in the graph then a discreet object list must be specified. This discreet list will represent the primary metadata objects. An object list is a comma separated list of the literal 'Object' followed by an alpha-numeric alias. An object list can only be used if a where clause is specified. ALL aliases used in the object list MUST be referenced by the where clause. NOTE: when an object list is specified with a where clause, one of the response graphs will contain one of the following:

Zero objects: This can occur if none of the aliased objects match the where clause criteria.

n objects<length(Object list): This can occur if the where clause filters out some of the aliased objects.

n objects>length(Object list): This is the most likely occurrence and it occurs when a transitive closure of all alias objects and their references is performed. Since reference objects will be part of the response graph, the graph will thus have more objects than the object list. This behavior can be controlled with options (explained below).

n objects==length(Object list): This can occur if the where clause captures only the objects represented in the object list.

iii. Connection

The metadata query statement is executed by a Metadata Query Executor. The executor will need to load the metadata resource(s) that the query needs to be executed against. This may involve connecting to a remote system and provided credentials for authentication. The information required for connection may be provided separately as configuration to a particular query execution instance; however, as a convenience, the connection properties can be included as part of the query statement. Connection properties can be provided as part of the statement in one of two formats. Both formats are required to follow the keyword 'from'.

Alias Format: To support the case where multiple named connections are configured within the Query Executor, a connection can be referenced in the query statement using an alias. The statement supports any alphanumeric name (no spaces). It is up to the Query Executor to determine whether the alias is valid (i.e. matches a configured connection).

Embedded Format: Embedded connections are named value pairs within curly braces. Each property should be on a new line.

Specifying a connection is completely optional in a statement. If a connection is not specified it is assumed that the executor instance has been configured with the necessary connection information.

iv. Where Clause

The optional where clause is used to filter objects in the resulting metadata graph by specifying a list of predicates. These predicates are combined with "and" and "or" so that the entire where clause becomes a predicate on the objects in the object list. The following predicates are supported in the where clause.

Predicate functions: A predicate function takes a variable amount of parameters and always returns true or false.

Predicate statements: Predicate statements are a combination of terms that always evaluate to true or false. For example x=y or function(x)=y.

v. Options Clause

Options are variable properties that are supported by the Query Executor and can be used to alter the results of the query. They can be specified as a list of name=value pairs that can be used or ignored by the Query Executor.

D. Metadata Graph Definition

To better understand the objects that are returned as a result of a query, as well as the list of objects passed in to the object list (described above), a description of the metadata graph is given in this section.

The basic structure of the graph is a list of objects and corresponding operations. Each metadata object can have zero or more operations and zero or more references to other objects. Access to object references and operations on a specific metadata object can be accessed via fields (aka attributes or properties) of that object. For example, a metadata object Contact may have reference to another object Address. This relationship between Contact and Address may be realized by the "address" field of the Contact object. We can ask about this relationship with queries. For example:

1) Is there an address field in the Metadata object with name "Contact"

Query: 'Select Object a from myconnection where exists (a["fields"].address) and a["name"]="Contact"'

This Query will either return a graph with zero objects if either the exists function returns false, or there is no object named "Contact" in the applications metadata, or it will return the Contact object along with any references.

2) Find all metadata objects that reference the Address object

Query: 'Select Object obj from myconnection where references(a, "{urn:myapplication}Address")'

This query searches for any object that contains a reference to an Address object referred to in this case by a fully qualified name (QName).

In both of the examples above, only the query string is showed. In practice, query strings would most likely be used in the context of a programming language that leverages an implementation of the Metadata Query Executor to run the query and return a result. The result of metadata queries are metadata graphs. An example of a query used in the Java programming language and returning a graph is shown in the pseudocode below:

```
//Instantiate the Query Executor
QueryExecutor queryExec = new QueryExecutor( );
//Instantiate a connection object
Connection connection = new Connection("myconnection");
connection.setURL("http://companyA.com/application?WADL");
connection.setUserName("user");
connection.setPassword("password");
//create query string
String queryString = 'Select Object obj from myconnection where
references(a,"{urn:myapplication}Address")';
MetadataGraph result = queryExec.execute(queryString);
MetadataObject contactObject = result.getObjectByName("Contact");
//Get all primary objects. Primary objects are those referenced in the object list
List<MetadataObject> primaryObjects = result.getPrimaryObjects( );
```

As the Example code above shows, executing a query returns a graph that can be further explored by the developer using any language for which there is a Metadata Query Executor implementation.

E. Use Cases i. UC-1: Developer Testing

Overview: Metadata queries can be used to assert properties of application metadata objects. In this use case a developer verifies that the metadata for his application has a specific object with expected properties:

```
String query = "Select Object a, Object b from conn1 where a["qname"] = "{urn:myns}Contact"
and b["qname"] = "{ur:myns} Incident";
MetadataGraph graph = query.execute(query);
//The following code assumes a unit test is being run. Assert is a function that verifies a result is
true
//Verify that there is a contact object in the results.
assertNotNull(graph.getObjectByQName("{urn:myns}Contact");
```

Advantages: Without the metadata query language this test would have to directly handle parsing of the application metadata and the searching for objects would have to be specific code written by the developer. The Metadata Query Language and query executor allows for a standard way to search for metadata objects.

ii. UC-2: Migration

Overview: RESTful APIs have become the most common form of APIs for web applications and SOAP based APIs are being supplanted. Many applications are thus migrating their SOAP based APIs to RESTful APIs and in the process the metadata format is being changed. Clients of these applications have to react to the change. With current technology the reaction is very gradual since it takes a bit of development cost and time to change existing code from one metadata format to another. Chief among the problems is discovering the differences between the RESTful and SOAP Metadata objects. The metadata query language can make this simpler as the following example shows.

```
//Assume we have two connections
Connection soapConnection = ...; //this is the connection to the SOAP API for an application
Connection restConnection = .; // this is the connection to the REST API for an application
//We use the same query for both connections however we can substitute the connection name.
String queryString = "Select * from ${conn}"; //we 'll select all objects
MetadataGraph graph1 = query.execute(soapConnection,queryString);
MetadataGraph graph2 = query.execute(restConnection,queryString);
//Now that we have two graphs we can attempt to compare them using the attributes of the
graph.
```

Advantages: With metadata query a developer can reuse the same query regardless of the metadata format. This saves time as developers do not need to write different code for different metadata formats.

iii. UC-3: Generation Tools

Overview: A common task for consumers of application metadata (developers) is serialization/deserialization of metadata objects to objects in a specific programming language. This process is often known as databinding. The process can be dynamic or static. With static databinding, tools can be used to generate the object structures for metadata. As an example, a Swagger document can be used to generate Java classes using a swagger generation tool. The same process can be used for WSDL, albeit using a different tool. The metadata query language can be leveraged to make generating language specific objects a lot easier as this example shows:

```
//Assuming the developer has written a tool to convert a MetadataGraph to a language
specific set of objects
String queryString = "Select * from myconn1";
MetadataGraph graph = query.execute(queryString);
//Now a tool can be used to generate Java classes from all MetadataObjects in the graph.
GenerationTool.generate("com.oracle.demo",graph);
//... somewhere later in code these generated classes can be used directly. For example the
customer object can be instantiated directly.
Contact contact = new Contact( );
contact.setAddress(new
Address("street","city","state","country"));
```

Advantages: Use of the query language vastly simplifies this process. Instead of myriad tools to generate classes, only one tool needs to be written. A similar process can be followed for dynamic data binding as well. This process also benefits from the fact that should the application metadata migrate to a completely different format, the exact query can be re-run, and the generation tool can regenerate the code.

iv. UC-4: Composite Metadata

Overview: Applications are not required to only have one source and format for metadata. In fact, it's not uncommon for this to be impractical. An application may expose a Swagger/REST/WADL metadata document for its static metadata and meanwhile maintain another nonstandard format for dynamic metadata. An example of dynamic metadata would be custom fields of an object (ex. Contact) that can be added by a customer using an external application.

This dynamic metadata can be considered an extension of the static metadata or in some cases a customization of that information. This poses a challenge to client applications that wish to consume all of an applications metadata in a consistent manner. Although the metadata query is abstract enough to represent any metadata, custom metadata may also require custom metadata parsers. For combining multiple metadata sources, an application can thus publish a single composite of all metadata, and custom metadata parsers can be created to process that metadata. Parsers are configured as part of the Query Executor component. So although the query remains the same, the Query Executor will handle the task of parsing the composite metadata:

```
//Configure a connection
Connection con = new Connection(new ExampleCustomParser( ),"http://<metadataLocation>");
String queryString = "select Object a from con where exists(a["fields"].incident)";
MetadataGraph graph = query.execute(queryString);
```

Advantages: There is no existing way to perform this with current tools, only custom solutions exists. The metadata query and query execution components make this very simple. The components of metadata query execution are easily extendable making complicated tasks like the above easy to simplify.

What is claimed is:

1. A method comprising:
   executing, by a computer system, a query against a metadata model to obtain a result, the result identifying a first metadata object of the metadata model, wherein the metadata model comprises a plurality of hierarchically-related metadata objects, each metadata object including information indicative of one or more semantics of data for an application;
   determining, by the computer system from the plurality of metadata objects, a second metadata object hierarchically-related to the first metadata object;
   building, by the computer system, a directed graph including the first metadata object and the second metadata object, wherein the directed graph comprises a set of vertices and a set of one or more edges, the set of vertices including vertices corresponding to the first metadata object and the second metadata object, wherein each edge in the set of one or more edges connects two vertices from the set of vertices and represents a hierarchical relationship between the metadata objects corresponding to the two vertices; and
   providing, by the computer system, a response to the query, wherein the response includes the directed graph.

2. The method of claim 1, wherein the data for the application comprise a set of one or more data members of the data, each data member corresponding to a metadata object of the plurality of metadata objects; and
   wherein the data members are hierarchically related based on the hierarchical relationships among the plurality of metadata objects.

3. The method of claim 2, wherein one or more of the plurality of metadata objects includes an attribute that defines a meaning of the corresponding data member; and
   wherein the one or more semantics of the data are indicated by the attribute of the one or more of the plurality of metadata objects.

4. The method as in claim 1, wherein:
the metadata model comprises a plurality of nodes and information indicative of hierarchical relationships among the plurality of nodes, the plurality of nodes corresponding to the plurality of metadata objects;
the method further comprises:
determining, from the metadata model, a first node from the plurality of nodes, the first node representing the first metadata object;
determining, from the metadata model, a descendent node of the first node; and
determining the second metadata object represented by the descendent node.

5. The method as in claim 1, wherein:
the metadata model comprises a plurality of nodes and information indicative of hierarchical relationships among the plurality of nodes, the plurality of nodes corresponding to the plurality of metadata objects and including a root node and a plurality of descendent nodes of the root node;
the second metadata object is determined based on:
determining, from the metadata model, a path between the root node of the metadata model and a first node of the plurality of descendent nodes, the first node representing the first metadata object;
determining one or more intermediary nodes in the path between the root node and the first node representing the first metadata object; and
determining the second metadata object based on one or more metadata objects represented by the one or more intermediary nodes.

6. The method as in claim 1, further comprising:
obtaining metadata associated with the application;
determining a format of the metadata;
determining, from a plurality of parsers, a parser based on the format of the metadata, each of the plurality of parsers being associated with a particular format of a plurality of formats; and
executing the determined parser to parse the metadata to generate the metadata model.

7. The method of claim 1, further comprising:
extracting an identifier associated with the application;
based on the identifier, receiving location information identifying a location where metadata associated with the application is stored;
obtaining the metadata associated with the application based on the location information; and
generating the metadata model based on the metadata.

8. The method of claim 1, further comprising:
obtaining the data;
performing an introspection operation on the data; and
generating the metadata model based on a result of the introspection operation.

9. The method of claim 1, wherein:
the query specifies one or more conditions for selecting the first metadata object; and
wherein the one or more conditions include at least a part of a label associated with the first metadata object.

10. The method of claim 9, wherein the one or more conditions include a wildcard expression and a filter expression, the combination of the wildcard expression and the filter expression that specifies that the filter expression is to be applied to all metadata objects of the metadata object to select the first metadata object.

11. The method of claim 9, wherein executing the query comprises identifying one or more child metadata objects of the first metadata object; and
wherein the second metadata object is a child metadata object of the first metadata object.

12. The method of claim 9, wherein executing the query comprises identifying a parent metadata object of the selected one or more metadata objects; and
wherein the second metadata object is the parent metadata object of the first metadata object.

13. The method as in claim 9, wherein:
the directed graph is a first directed graph;
the query specifies one or more conditions for selecting the first metadata object and a fourth metadata object; and
the method further comprises:
building a second directed graph including the first metadata object and the fourth metadata object; and
providing the response to the query including the first directed graph and the second directed graph.

14. The method as in claim 1, further comprising:
receiving, by the computer system, connection information including at least one of: a universal resource link (URL) or credential information;
establishing, by the computer system, a connection between the computer system and a remote device that stores metadata of the application; and
obtaining, by the computer system, the metadata from the remote device via the connection.

15. The method of claim 14, wherein the connection information is included in the query.

16. An apparatus comprising:
a memory that stores a set of instructions; and
a hardware processor configured to execute the set of instructions to:
execute a query against a metadata model to obtain a result, the result identifying a first metadata object of the metadata model, wherein the metadata model comprises a plurality of hierarchically-related metadata objects, each metadata object including information indicative of one or more semantics of data for an application;
determine, from the plurality of metadata objects, a second metadata object hierarchically-related to the first metadata object;
build a directed graph including the first metadata object and the second metadata object, wherein the directed graph comprises a set of vertices and a set of one or more edges, the set of vertices including vertices corresponding to the first metadata object and the second metadata object, wherein each edge in the set of one or more edges connects two vertices from the set of vertices and represents a hierarchical relationship between the metadata objects corresponding to the two vertices; and
provide a response to the query, wherein the response includes the directed graph.

17. The apparatus of claim 16, wherein:
the data for the application comprise a set of one or more data members of the data, each data member corresponding to a metadata object of the plurality of metadata objects; and
the data members are hierarchically related based on the hierarchical relationships among the plurality of metadata objects, one or more of the plurality of metadata objects includes an attribute that defines a meaning of the corresponding data member; and the one or more semantics of the data are indicated by the attributes of the one or more of the plurality of metadata objects.

18. The apparatus of claim 16, wherein:

the query specifies one or more conditions for selecting the first metadata object; and the one or more conditions include at least a part of a label associated with the first metadata object; and the one or more conditions include a wildcard expression and a filter expression, the combination of the wildcard expression and the filter expression that specifies that the filter expression is to be applied to all metadata objects of the metadata object to select one or more metadata objects.

19. A non-transitory computer-readable memory comprising instructions which, when executed by one or more processors, cause the one or more processors to perform:

executing a query against a metadata model to obtain a result, the result identifying a first metadata object of the metadata model, wherein the metadata model comprises a plurality of hierarchically-related metadata objects, each metadata object including information indicative of one or more semantics of data for an application;

determining, from the plurality of metadata objects, a second metadata object hierarchically-related to the first metadata object;

building a directed graph including the first metadata object and the second metadata object, wherein the directed graph comprises a set of vertices and a set of one or more edges, the set of vertices including vertices corresponding to the first metadata object and the second metadata object, wherein each edge in the set of one or more edges connects two vertices from the set of vertices and represents a hierarchical relationship between the metadata objects corresponding to the two vertices; and providing a response to the query, wherein the response includes the directed graph.

20. The non-transitory computer-readable memory of claim 19, wherein:

the data for the application comprise a set of one or more data members of the data, each data member corresponding to a metadata object of the plurality of metadata objects; and the data members are hierarchically related based on the hierarchical relationships among the plurality of metadata objects;

one or more of the plurality of metadata objects includes an attribute that defines a meaning of the corresponding data member; and the one or more semantics of the data are indicated by the attributes of the one or more of the plurality of metadata objects.

* * * * *

UNITED STATES PATENT AND TRADEMARK OFFICE
CERTIFICATE OF CORRECTION

PATENT NO. : 11,615,151 B2
APPLICATION NO. : 17/079339
DATED : March 28, 2023
INVENTOR(S) : Simeon Greene It is certified that error appears in the above-identified patent and that said Letters Patent is hereby corrected as shown below:

In the Specification

In Column 3, Lines 44-50, delete "determining, from the metadata model, a first node from the plurality of nodes, the first node representing the first metadata object; determining, from the metadata model and the hierarchical relationships, a leaf node that is a descendent node of the first node; determining a fourth metadata object represented by the leaf node; and building the directed graph to include the fourth metadata object." and insert the same on Column 3, Line 43, as the continuation of same paragraph, therefor.

In Column 5, Line 38, delete "including;" and insert -- including --, therefor.

In Column 5, Line 55, delete "The" and insert -- the --, therefor.

In Column 26, Line 38, delete ""!"" and insert -- "!=" --, therefor.

In Column 26, Line 63, delete "'>='" and insert -- '<=' --, therefor.

In Column 27, Line 36, delete "objects==length" and insert -- objects=length --, therefor.

In Columns 29-30, Line 30, delete ""{um:myns}" and insert -- "{urn:myns} --, therefor.

In Columns 29-30, Line 31, delete ""{um:myns}" and insert -- "{urn:myns} --, therefor.

In Columns 29-30, Line 57, delete "= .;" and insert -- = ...; --, therefor.

Signed and Sealed this
Thirteenth Day of February, 2024

Katherine Kelly Vidal
*Director of the United States Patent and Trademark Office*